United States Patent
Zhang et al.

(10) Patent No.: US 10,616,577 B2
(45) Date of Patent: Apr. 7, 2020

(54) ADAPTIVE VIDEO DEBLOCKING

(71) Applicant: Intel Corporation, Santa Clara, CA (US)

(72) Inventors: Ximin Zhang, San Jose, CA (US);
Sang-Hee Lee, San Jose, CA (US);
Dmitry Ryzhov, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 149 days.

(21) Appl. No.: 15/784,446

(22) Filed: Oct. 16, 2017

(65) Prior Publication Data

US 2019/0116358 A1   Apr. 18, 2019

(51) Int. Cl.
| | |
|---|---|
| *H04N 19/117* | (2014.01) |
| *H04N 19/86* | (2014.01) |
| *H04N 19/136* | (2014.01) |
| *H04N 19/174* | (2014.01) |
| *H04N 19/172* | (2014.01) |
| *H04N 19/176* | (2014.01) |
| *H04N 19/157* | (2014.01) |

(52) U.S. Cl.
CPC ......... *H04N 19/117* (2014.11); *H04N 19/136* (2014.11); *H04N 19/157* (2014.11); *H04N 19/172* (2014.11); *H04N 19/174* (2014.11); *H04N 19/176* (2014.11); *H04N 19/86* (2014.11)

(58) Field of Classification Search
CPC ....... H04N 19/00; H04N 19/117; H04N 19/86
See application file for complete search history.

(56) References Cited

U.S. PATENT DOCUMENTS

| | | | | |
|---|---|---|---|---|
| 2005/0013494 | A1* | 1/2005 | Srinivasan | H04N 19/139 382/233 |
| 2008/0199090 | A1* | 8/2008 | Tasaka | H04N 19/139 382/233 |
| 2013/0188733 | A1* | 7/2013 | Van der Auwera | H04N 19/70 375/240.24 |

OTHER PUBLICATIONS

List et al. "Adaptive Deblocking Filter." IEEE Transactions on Circuits and Systems for Video Technology, vol. 13, No. 7, Jul. 2003 (Year: 2003).*

* cited by examiner

*Primary Examiner* — Brian T Pendleton
*Assistant Examiner* — Kyle M Lotfi
(74) *Attorney, Agent, or Firm* — Green, Howard & Mughal LLP.

(57) ABSTRACT

Adaptive video deblocking techniques include selecting a deblock filter strength threshold offset based on a picture or slice level quantization parameter being within a particular zone of multiple zones of a range of available quantization parameters such that each zone has a preselected deblock filter strength threshold offset corresponding thereto.

20 Claims, 8 Drawing Sheets

| Q | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| β' | 0 | 0 | 0 | 0 | 0 | 0 | 0 | 0 | 0 | 0 | 0 | 0 | 0 | 0 | 0 | 0 | 6 | 7 | 8 |
| tc' | 0 | 0 | 0 | 0 | 0 | 0 | 0 | 0 | 0 | 0 | 0 | 0 | 0 | 0 | 0 | 0 | 0 | 0 | 1 |
| Q | 19 | 20 | 21 | 22 | 23 | 24 | 25 | 26 | 27 | 28 | 29 | 30 | 31 | 32 | 33 | 34 | 35 | 36 | 37 |
| β' | 9 | 10 | 11 | 12 | 13 | 14 | 15 | 16 | 17 | 18 | 20 | 22 | 24 | 26 | 28 | 30 | 32 | 34 | 36 |
| tc' | 1 | 1 | 1 | 1 | 1 | 1 | 1 | 1 | 2 | 2 | 2 | 2 | 3 | 3 | 3 | 3 | 4 | 4 | 4 |
| Q | 38 | 39 | 40 | 41 | 42 | 43 | 44 | 45 | 46 | 47 | 48 | 49 | 50 | 51 | 52 | 53 | | | |
| β' | 38 | 40 | 42 | 44 | 46 | 48 | 50 | 52 | 54 | 56 | 58 | 60 | 62 | 64 | - | - | | | |
| tc' | 5 | 5 | 6 | 6 | 7 | 8 | 9 | 10 | 11 | 13 | 14 | 16 | 18 | 20 | 22 | 24 | | | |

ADAPTIVE VIDEO DEBLOCKING

BACKGROUND

In compression/decompression (codec) systems, compression efficiency and video quality are important performance criteria. For example, visual quality is an important aspect of the user experience in many video applications and compression efficiency impacts the amount of memory storage needed to store video files and/or the amount of bandwidth needed to transmit and/or stream video content. For example, a video encoder compresses video information so that more information can be sent over a given bandwidth or stored in a given memory space or the like. The compressed signal or data may then be decoded via a decoder that decodes or decompresses the signal or data for display to a user. In most implementations, higher visual quality with greater compression is desirable.

Deblock filtering is an important feature in modern video coding standards such as the H.264/MPEG-4 Advanced Video Coding (AVC) standard and the H.265 High Efficiency Video Coding (HEVC) standard. Such deblock filtering improves both objective and subjective video quality. In the standards, a set of parameters are defined to regulate the deblock filtering operations and default values of the parameters are provided based on optimizations of the standard reference codec and test clips during the standardization process. However, in implementation, the default values may not be optimal due to the different encoder design and video content variations. For example, blocking artifacts or over smoothing can be observed.

It may be advantageous to improve deblock filter selection for deblock filtering to provide improved compression efficiency and/or video quality. It is with respect to these and other considerations that the present improvements have been needed. Such improvements may become critical as the desire to compress and transmit video data becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
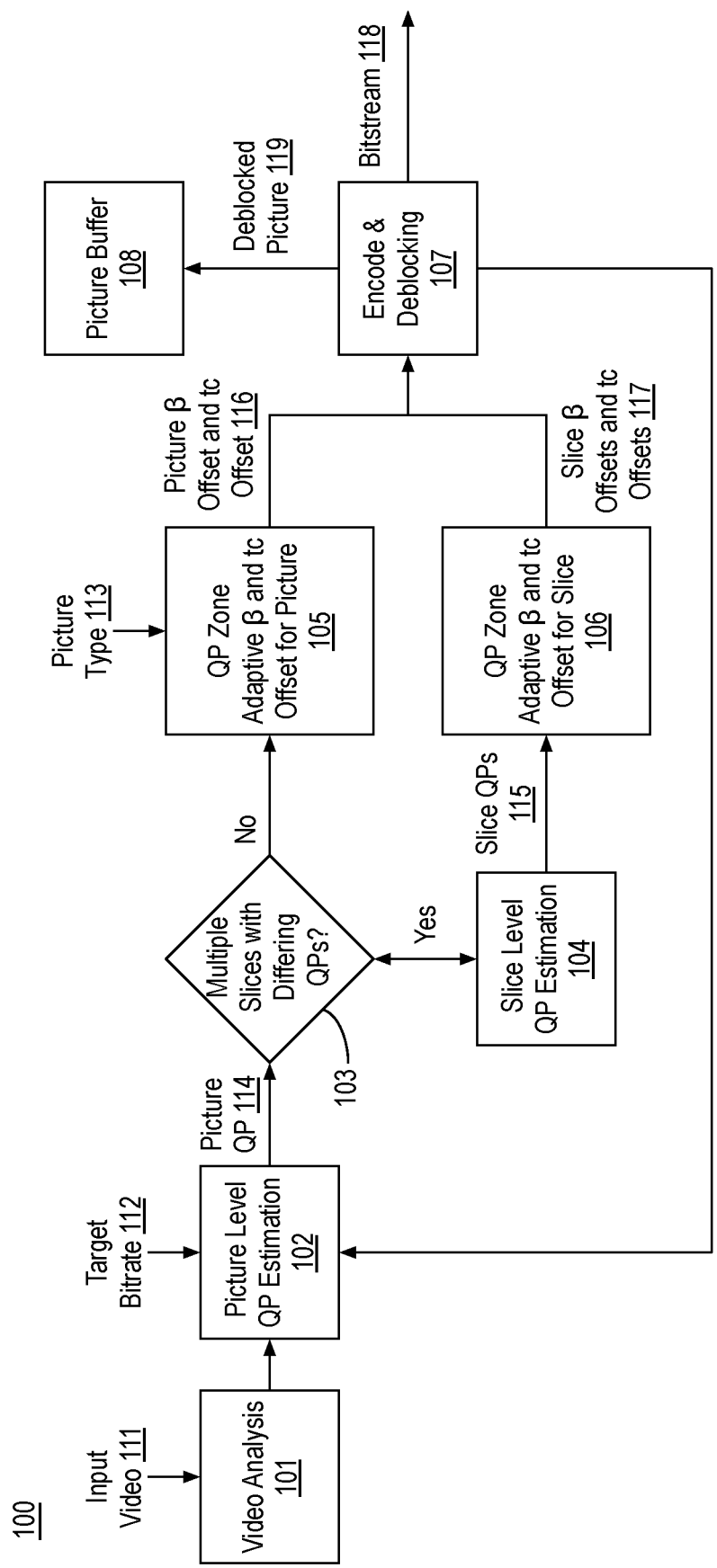
FIG. 1 is an illustrative diagram of an example system for providing video coding.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation.

Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to video coding and, in particular, to adaptive video deblocking.

As described above, in modern video coding standards, the deblocking filter is an important feature that can provide improved efficiency and/or video quality. The AVC and HEVC standards provide a framework for determining whether two adjacent blocks are to be deblock filtered and, if so, the strength (e.g., filter length) of the filter to be applied. For example, a boundary strength (i.e., bS) between two adjacent blocks may be evaluated based on the coding of the blocks (e.g., at least one block is intra, at least one block has non-zero residual coefficients and a boundary between the blocks is a transform boundary, absolute differences between spatial motion vector components is >=1 integer pixel, or motion compensated prediction refers to different pictures or the number of motion vectors is different for the blocks). If the boundary strength meets such criteria, an evaluation may be made as to how much the signal on both sides of the boundary deviates from a straight line. For example, the pixel values of the two blocks may be evaluated to determine how much they deviate from a straight line and the resultant measurement may be compared to a deblock filter strength threshold β. If the boundary strength meets the discussed criteria and the resultant deviation from linearity measurement is less than the deblock filter strength threshold β, deblock filtering is applied. Next, a determination as to filter strength (e.g., the number of pixels to be changed in the filtering) is made. For example, if a measure of spatial activity of the two blocks is less than the deblock filter strength threshold β divided by eight (e.g., β/8), a measurement of flatness of the signal on both sides of the boundary is less than the deblock filter strength threshold β divided by eight (e.g., β/8), and if a measurement of intensity difference of samples across the boundary is less than a deblock filter strength threshold $t_c$ multiplied by 2.5 (e.g., 2.5 $t_c$), a strong deblock filter is applied and, if not, a normal deblock filter is applied. Furthermore, in normal deblock filter operations, additional modes may be determined based on deblock filter strength threshold β such that the number of pixels changed during filtering is varied.

In the determination of deblock filter strength threshold β and deblock filter strength threshold $t_c$, the encoder may provide offsets for the adjustment of the thresholds: a deblock filter strength threshold β offset and a deblock filter strength threshold $t_c$ offset. For example, the HEVC standard provides that such offsets may be provided at the picture level or the slice level. At the picture level, a deblock filter strength offset or deblocking parameter offset for filter strength threshold β may be provided as pps_beta_offset_div2 (e.g., the offset divided by two) and/or a deblock filter strength offset or deblocking parameter offset for filter strength threshold $t_c$ may be provided as pps_tc_offset_div2 (e.g., the offset divided by two). Similarly, at the slice level, a deblock filter strength offset or deblocking parameter offset for filter strength threshold β may be provided as slice_beta_offset_div2 (e.g., the offset divided by two) and/or a deblock filter strength offset or deblocking parameter offset for filter strength threshold $t_c$ may be provided as slice_tc_offset_div2 (e.g., the offset divided by two). As used herein the terms deblock filter strength threshold β offset and a deblock filter strength threshold $t_c$ offset are any suitable values that may vary deblock filter strength threshold β and deblock filter strength threshold $t_c$ for the implementation of deblock filtering (e.g., whether filtering is to be applied, filter strength, etc.).

In some embodiments discussed herein, a picture or slice of video may be received for coding such that the picture or slice has a picture or slice level quantization parameter corresponding thereto. For example, the picture or slice level quantization parameter may be determined using any suitable technique or techniques known in the art such that the picture or slice level quantization parameter is within a range of available quantization parameters. For example, the range of available quantization parameters may be established by the video codec being implemented. In an embodiment, the range of available quantization parameters is from zero or one to 51. A deblock filter strength threshold β offset or $t_c$ offset is selected based on the picture or slice level quantization parameter being within a particular zone of a plurality of zones of the range of available quantization parameters. For example, each zone of the plurality of zones includes multiple consecutive quantization parameters of the range of available quantization parameters and each zone has a preselected deblock filter strength threshold β offset or $t_c$ offset corresponding thereto. In an embodiment, prior to implementation, the range of available quantization parameters is split into multiple zones (e.g., two to 13 zones) and each zone is assigned a particular deblock filter strength threshold β offset and $t_c$ offset. During implementation, a deblock filter strength threshold β offset and/or $t_c$ offset is then selected by determining the picture or slice level quantization parameter (in contrast to a block level quantization parameter) is within a particular zone and using the corresponding deblock filter strength threshold β offset and/or $t_c$ offset corresponding to the zone. An indicator corresponding to the selected deblock filter strength threshold β offset or $t_c$ offset is then encoded into a bitstream picture or slice header for the picture or slice of video for use at a decoder. For example, the bitstream may be transmitted or stored. In an embodiment, the indicator corresponding to the selected deblock filter strength threshold β offset or $t_c$ offset is one of the discussed deblocking parameter offset values: pps_beta_offset_div2, pps_tc_offset_div2, slice_beta_offset_div2, and slice_tc_offset_div2.

Such techniques provide an adaptive method to control two key parameters for deblock filtering: beta (deblock filter strength threshold β) and TC (deblock filter strength threshold $t_c$), which are utilized in AVC/HEVC deblocking filtering to determine whether deblock filtering is to be applied to adjacent blocks and/or to determine which filter is to be applied to adjacent blocks. For example, instead of using default or fixed values for the picture parameter set (PPS) and slice level offsets, the offset values are adaptively decided based on the actual picture level and slice level quantization values as is discussed further herein. Such adaptive determination of the offset values (e.g., deblock filter strength threshold β offset and/or $t_c$ offset values) may be performed using quantization parameter (QP) zone adaptive adjustment techniques to control the PPS and slice level offsets. Such selected deblock filter strength threshold β offsets and $t_c$ offsets are then transmitted to the decoder in a bitstream and used locally for deblock filtering in the local decode loop. Such techniques may be integrated into a video encoder architecture to improve compression efficiency and video quality. For example, the discussed techniques improve the visual experience of the resultant decoded video and provide an average BDRATE gain in a wide range of video classes with up to 2% gain in some video clips.

FIG. 1 is an illustrative diagram of an example system 100 for providing video coding, arranged in accordance with at least some implementations of the present disclosure. As shown in FIG. 1, system 100 may include a video analysis module 101, a picture level QP estimation module 102, a slice level QP analysis module 103 (labeled "multiple slices with diffing QPs?" in FIG. 1), a slice level QP estimation module 104, a QP zone adaptive β and $t_c$ offset for picture module 105, a QP zone adaptive β and $t_c$ offset for slice module 106, an encode and deblocking module 107, and a picture buffer 108. Also as shown, video analysis module 101 receives input video 111, picture level QP estimation module 102 receives target bitrate 112, and QP zone adaptive β and $t_c$ offset for picture module 105 receives picture type 113.

For example, system 100 may receive input video 111 for coding and system 100 may provide video compression to generate a bitstream 118 such that system 100 may be a video encoder implemented via a computer or computing device or the like. As discussed further herein, deblock filter strength threshold β offset and $t_c$ offset values are determined using QP zone adaptive techniques and inserted into bitstream 118 by insertion into, for example, picture and slice headers of bitstream 118. Bitstream 118 may be any suitable bitstream such as a standards compliant bitstream. For example, bitstream 118 may be H.264/MPEG-4 Advanced Video Coding (AVC) standards compliant, H.265 High Efficiency Video Coding (HEVC) standards compliant, VP9 standards compliant, etc. System 100 may be implemented via any suitable device such as, for example, a personal computer, a laptop computer, a tablet, a phablet, a smart phone, a digital camera, a gaming console, a wearable device, an all-in-one device, a two-in-one device, or the like or a platform such as a mobile platform or the like. For example, as used herein, a system, device, computer, or computing device may include any such device or platform.

System 100 may include other modules or components not shown for the sake of clarity of presentation. For example, system 100 may include a partition module, a transform module, a quantization module, an intra prediction module, a motion estimation module, a motion compensation module, a sample adaptive offset (SAO) filtering module, a scanning module, etc. In some examples, in system 100, the deblocking portion of encode and deblocking module 107 is implemented in a local decode loop that generates deblocked pictures 119 that are stored in picture buffer 108 and used in the encoding process as reference pictures for motion estimation and compensation. Furthermore, the local decode loop may include an inverse quantization module, an inverse transform module, and an adder for combining reconstructed residual blocks with reference blocks. Such reconstructed blocks may be combined into pictures and deblock filtered using techniques discussed herein. Such modules are known to those of skill in the art and are not discussed further herein for the sake of clarity in presenting the described techniques.

As discussed, system 100 receives input video 111. Input video 111 may include any suitable video frames, video pictures, sequence of video frames, group of pictures, groups of pictures, video data, or the like in any suitable resolution. For example, the video may be video graphics array (VGA), high definition (HD), Full-HD (e.g., 1080p), 4K resolution video, 5K resolution video, or the like, and the video may include any number of video frames, sequences of video frames, pictures, groups of pictures, or the like.

Techniques discussed herein are discussed with respect to pictures, slices, and blocks for the sake of clarity of presentation. However, such pictures may be characterized as frames, video frames, sequences of frames, video sequences, or the like, and such blocks may be characterized as coding units, coding blocks, macroblocks, sub-units, sub-blocks, or the like. For example, a picture or frame of color video data may include a luminance plane or component and two chrominance planes or components at the same or different resolutions with respect to the luminance plane. Input video 111 may include pictures or frames that may be divided into blocks of any size, which contain data corresponding to, for example, M×N blocks of pixels. Such blocks may include data from one or more planes or color channels of pixel data. As used herein, the term block may include macroblocks, coding units, or the like of any suitable sizes. As will be appreciated such blocks may also be divided into sub-blocks for prediction, transform, or the like.

Figure 2:
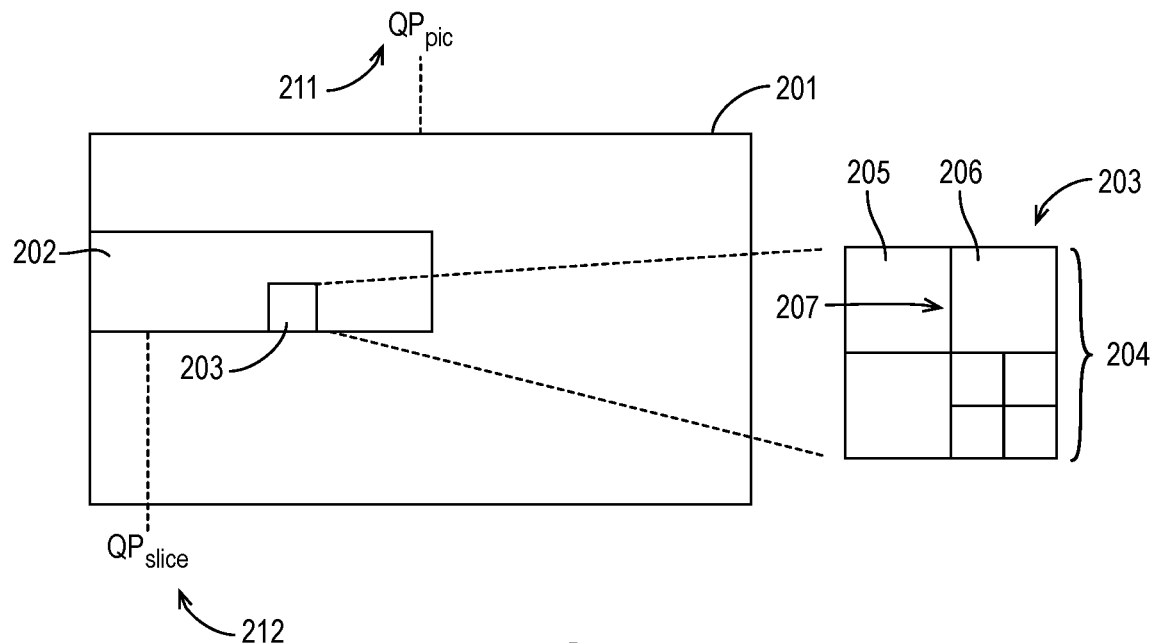
FIG. 2 illustrates an example video picture.

FIG. 2 illustrates an example video picture 201, arranged in accordance with at least some implementations of the present disclosure. Video picture may include any picture of a video sequence or clip such as a VGA, HD, Full-HD, 4K, 5K, etc. video picture. As shown, video picture 201 may be segmented into one or more slices as illustrated with respect to slice 202 of video picture 201. Furthermore, video picture 201 may be segmented into one or more largest coding units as illustrated with respect to largest coding unit 203, which may, in turn, be segmented into one or more coding units and/or transform units 204. In the illustrated embodiment, video picture 201 is segmented into largest coding units, which are segmented into coding/transform units. For example, HEVC specifies a largest coding unit (LCU) for a picture that may then be partitioned into coding units (CUs) that take the form of rectangular blocks having variable sizes. HEVC also defines prediction units (PUs) and transform units (TUs) that specify how a given CU is to be partitioned for prediction and transform purposes, respectively. However, other codecs may use macroblocks, blocks, units, sub-units, etc. for the coding architecture. As used, herein, the term block may refer to any partition or subpartition of a video picture that is at the sub-picture and sub-slice level. For example, a block may refer to a coding unit, a prediction unit, a transform unit, a macroblock, a coding block, a prediction block, a transform block, or the like.

Furthermore, as shown in FIG. 2, largest coding unit 203 includes a coding unit 205 and a coding unit 206 having a boundary 207 therebetween. For example, boundary pixel samples of coding unit 205 are adjacent to boundary pixel samples of coding unit 206 across vertical boundary 207. As is discussed further herein, deblock filtering of boundary pixel samples of coding unit 205 and boundary pixel samples of coding unit 206 may be performed based on QP zone adaptive β and $t_c$ offsets determined using the techniques discussed herein. Furthermore, such QP zone adaptive β and $t_c$ offsets may be transmitted to a decoder for use in deblock filtering in a standard compliant bitstream, for example.

Returning to FIG. 1, as shown, video analysis module 101 receives input video 111. Video analysis module 101 may analyze input video 111 using any suitable technique or techniques such as rate distortion optimization techniques to provide coding decisions such as a picture type (e.g., I-, P-, B-picture) for each picture of input video 111, which may be provided to QP zone adaptive β and $t_c$ offset for picture module 105 as shown, partitioning decisions for each picture of input video 111 to divide each picture of input video 111 into slices, coding units, transform units, blocks, macroblocks, etc. depending on the codec being implemented. Input video 111, target bitrate 112, and a syntax including the decisions made by video analysis module 101 may be provided to picture level QP estimation module 102. Picture level QP estimation module 102 generates a picture level QP 114 for each picture of input video 111.

Picture level QP estimation module 102 may generate picture level QP 114 using any suitable technique or techniques. In an embodiment, picture level QP estimation module 102 generates picture level QP 114 based on target bitrate 112 and previous encode conditions of system 111. In an embodiment, picture level QP 114 is an average picture level QP for the current picture of input video 111. Furthermore, in some embodiments, slice level QP estimation module 104 generates slice level QPs 115 using any suitable technique or techniques. In an embodiment, slice level QP estimation module 104 also generates slice level QPs 115 based on target bitrate 112 and previous encode conditions of system 111. In an embodiment, slice level QPs 115 are each an average slice level QP for a particular slice of the current picture of input video 111. In an embodiment, no slice level QPs may be implemented for input video 111.

As used herein, a picture level QP indicates a quantization parameter corresponding to a picture of input video 111. Such picture level QPs may be varied at the slice level and/or at the block (e.g., coding tree unit, coding unit, transform unit, etc.) level. However, such slice level and/or block level QPs (although used for a sub-unit of the picture) are not picture level QPs as they do not globally apply to or globally correspond to each picture but instead only apply locally at the slice or block level or correspond to the slice or block level. Picture level QP 114 may be any suitable QP value allowed by the codec being implemented. For example, picture level QP 114 may be in the range of 0 to 51 such that lower QP values provide higher quality value (and higher bitrates) while higher QP values provide lower quality value (and lower bitrates).

As shown, picture level QP 114 may be provided to slice level QP analysis module 103. Slice level QP analysis module 103 receives picture level QP 114 and/or the syntax including the decisions made by video analysis module 101 and/or input video 111 and slice level QP analysis module 103 determines whether the current picture of input video 111 includes one or more slices having quantization parameters(s) that differ from picture level QP 114. In some embodiments, no slice level coding variations are used. In such embodiments, no slices level QP variation is indicated and processing for the current picture continues at QP zone adaptive β and $t_c$ offset for picture module 105 as discussed below. If slice level coding variations are provided, slice level QP analysis module 103 may determine whether one or more slices have quantization parameters(s) that differ from picture level QP 114 using any suitable technique or techniques. In an embodiment, slice level QP analysis module 103 determines whether any slices of the current picture have different quantization parameters(s) by analyzing each slice level QP to determine whether it is within or outside of a threshold of picture level QP 114.

For example, with reference to FIG. 2, video picture 201 may have a picture level QP 211 (labeled $QP_{pic}$) corresponding thereto and slice 202 may have a slice level QP 212 (labeled $QP_{slice}$) corresponding thereto. To determine whether the QP of slice 202 differs from the QP of video picture 201, an absolute value difference between picture level QP 211 and slice level QP 212 may be determined and compared to a predetermined threshold. When the difference does not exceed the predetermined threshold, a determination is made that slice 202 does not have a differing QP with respect to picture level QP 211. When the difference does exceed the predetermined threshold, a determination is made that slice 202 does have a differing QP and processing continues at QP zone adaptive β and $t_c$ offset for slice module 106 as is discussed further herein. The predetermined threshold may be any suitable value such as zero (such that the slice level QPs must match the picture level QP for no difference to be determined), a value in the range of two to six, or a value in the range of seven to ten.

Returning to FIG. 1, in some embodiments, when no slices with differing QPs are detected, no slice level variations are made, slice level QP zone adaptive β and $t_c$ offsetting has been bypassed (e.g., by a user or application selection), or a single slice is used for the current picture, QP zone adaptive β and $t_c$ offsets are determined using picture level QP 114 by QP zone adaptive β and $t_c$ offset for picture module 105 to generate picture β and $t_c$ offsets 116 for the current picture of input video 111. For example, as discussed, picture level QP 114 for the current picture is within a range of available quantization parameters that is based on the codec being implemented by system 100 (e.g., the picture level QP is between zero or one and 51, inclusive). In an embodiment, the range of available picture level quantization parameters (QP values) is segmented into multiple zones such that the zones are non-overlapping and collectively cover the entire range of available quantization parameters. Each zone is then assigned a corresponding preselected deblock filter strength threshold β offset and/or $t_c$ offset. During implementation, in response to the zone in which the current picture level QP falls, the corresponding preselected deblock filter strength threshold β offset and/or $t_c$ offset are assigned for the current picture at the picture level. For example, QP zone adaptive β and $t_c$ offset for picture module 105 determines which zone the picture level QP for the current picture is within and QP zone adaptive β and $t_c$ offset for picture module 105 selects the corresponding picture β and $t_c$ offsets 116 for the current picture.

Figure 3:
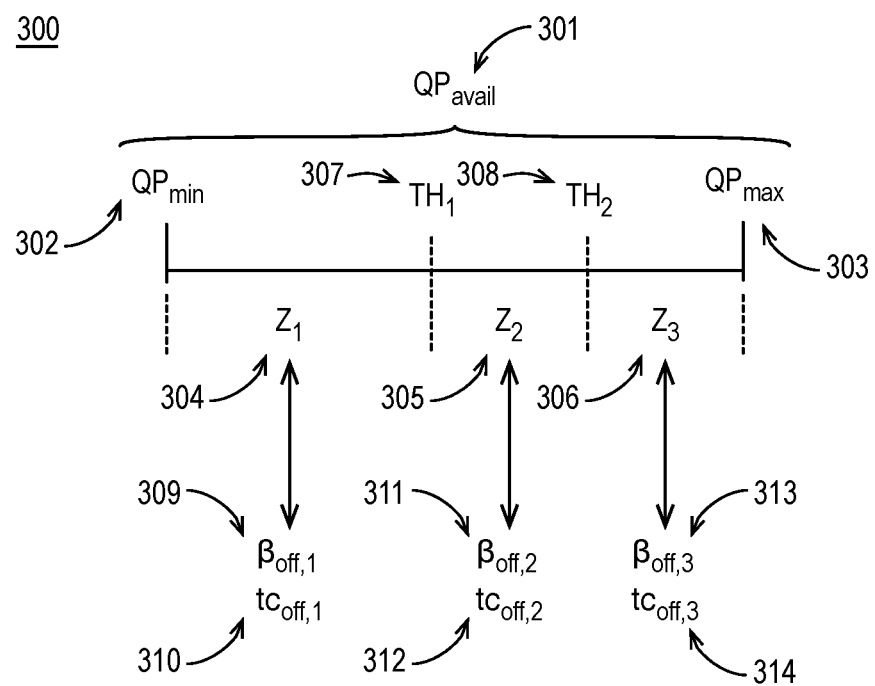
FIG. 3 illustrates an example data structure for providing QP zone adaptive $\beta$ and $t_c$ offsets.

FIG. 3 illustrates an example data structure 300 for providing QP zone adaptive β and $t_c$ offsets, arranged in accordance with at least some implementations of the present disclosure. Data structure 300 may be implemented using any suitable technique or techniques. In an embodiment, data structure 300 may be stored as a look up table in memory. As shown in FIG. 3, a range of available quantization parameters 301 (for a picture level QP or a slice level QP) may extend from a minimum available quantization parameter 302 (labeled $QP_{min}$) to a maximum available quantization parameter 303 (labeled $QP_{max}$), inclusive. The minimum available quantization parameter 302 and the maximum available quantization parameter 303 may be any suitable values based on the codec being implemented. For example, for AVC and HEVC, minimum available quantization parameter 302 may be zero or one and maximum available quantization parameter 303 may be 51. For example, available quantization parameters 301 may be integer values extending from minimum available quantization parameter 302 to maximum available quantization parameter 303. For example, the whole QP range as provided by range of available quantization parameters 301 may be separated into any number of zones, such as three zones.

In an embodiment, range of available quantization parameters 301 is segmented, divided, or separated into multiple zones 304, 305, 306 such that each of zones 304, 305, 306 includes multiple consecutive quantization parameters of range of available quantization parameters 301. In the illustrated embodiment, zone 304 (labeled $Z_1$) includes quantization parameters from minimum available quantization parameter 302 through a first quantization parameter threshold 307 (labeled $TH_1$), zone 305 (labeled $Z_2$) includes quantization parameters from the next available quantization parameter from first quantization parameter threshold 307 (e.g., $1+TH_1$) through a second quantization parameter threshold 308 (labeled $TH_2$), and zone 306 (labeled $Z_3$) includes quantization parameters from the next available quantization parameter from second quantization parameter threshold 308 (e.g., $1+TH_2$) through maximum available quantization parameter 303. In an embodiment, the whole QP range as provided by range of available quantization parameters 301 may be separated into three zones 304, 305, 306: zone 304 including QPs from minimum available quantization parameter 302 to first quantization parameter threshold 307 (e.g., $QP_{min} \leq QP < TH_1$), zone 305 including QPs from first quantization parameter threshold 307 to second quantization parameter threshold 308 (e.g., $TH_1 \leq QP < TH_2$), and zone 306 including QPs from second quantization parameter threshold 308 to maximum available quantization parameter 303 (e.g., $TH_2 \leq QP \leq QP_{max}$).

Also as shown, each of zones 304, 305, 306 is associated with, assigned, or provided a corresponding preselected deblock filter strength threshold β offset and $t_c$ offset. For example, zone 304 is assigned a preselected deblock filter strength threshold β offset 309 (labeled $β_{off,1}$) and a $t_c$ offset 310 (labeled $tc_{off,1}$), zone 305 is assigned a preselected deblock filter strength threshold β offset 311 (labeled $β_{off,2}$) and a $t_c$ offset 312 (labeled $tc_{off,2}$), and zone 306 is assigned a preselected deblock filter strength threshold β offset 313 (labeled $β_{off,3}$) and a $t_c$ offset 314 (labeled $tc_{off,3}$).

As discussed, during implementation, for a picture level QP or a slice level QP, a determination is made as to which of zones 304, 305, 306 the picture level QP or slice level QP falls into, is included in, is a member of, or the like. Based on which particular zone of zones 304, 305, 306 the picture level QP or slice level QP is a member of, the corresponding deblock filter strength threshold β offset and $t_c$ offset are assigned to the picture or slice. The deblock filter strength threshold β offset and $t_c$ offset are then included into a bitstream, for example, in the appropriate picture header (e.g., in the PPS header syntax) or slice header (e.g., in the slice header syntax) for storage and/or transmission to a decoder.

The decoder may then use the deblock filter strength threshold β offset and $t_c$ offset in deblock filtering operations. For example, the decoder may offset a quantization parameter corresponding to two adjacent blocks (e.g., an average QP of the blocks) with the deblock filter strength threshold β offset to determine a representative value for the adjacent blocks, which is used to determine the deblock filter strength threshold β using a look up table or the like. Similarly, the decoder may offset the quantization parameter corresponding to the two adjacent blocks with the deblock filter strength threshold $t_c$ offset to determine another representative value for the adjacent blocks, which is used to determine the deblock filter strength threshold $t_c$ using a look up table or the like. The deblock filter strength threshold β and $t_c$ are then used to determine whether deblock filtering is applied to the two adjacent blocks and, if so, the filter strength to use. Such post-deblock filter strength threshold β offset and $t_c$ offset determination techniques may also be performed by an encoder (e.g., system 100) to generate deblock filtered pictures as discussed further herein. Such techniques, performed at both a decoder and an encoder as part of a local decode loop may be standards defined, for example, and may depend on the codec being implemented. Examples of such techniques are discussed further herein below.

As shown, in an embodiment, range of available quantization parameters 301 is divided into three zones 304, 305, 306 using thresholds 307, 308. Thresholds 307, 308 may be any suitable values. In an embodiment, threshold 307 is between 40% and 55% of a difference between maximum available quantization parameter 303 and minimum available quantization parameter 302 and threshold 308 is between 65% and 75% of the difference between maximum available quantization parameter 303 and minimum available quantization parameter 302. In an embodiment, in the context of HEVC, maximum available quantization parameter 303 is 51, minimum available quantization parameter 302 is zero or one, threshold 307 is in the range of 21 to 29 and threshold 308 is in the range of 33 to 39. However, thresholds 307, 308 may be any suitable values. Furthermore, range of available quantization parameters 301 may be divided into any number of zones such as two to 13 zones.

With continued reference to FIG. 3, in an embodiment, preselected deblock filter strength threshold β offset 309 is zero, preselected deblock filter strength threshold $t_c$ offset 310 is zero, preselected deblock filter strength threshold β offset 311 is between one and four, inclusive, preselected deblock filter strength threshold $t_c$ offset 312 is between one and four, inclusive, preselected deblock filter strength threshold β offset 313 is zero, and preselected deblock filter strength threshold $t_c$ offset 314 is zero. However, any suitable values may be used based on the codec, device, application, etc. being implemented.

In some embodiments, such level preselected deblock filter strength threshold β and $t_c$ offsets may be implemented as pps_beta_offset_div2 (e.g., the β offset divided by two), pps_tc_offset_div2 (e.g., the $t_c$ offset divided by two), slice_beta_offset_div2 (e.g., the β offset divided by two), and slice_tc_offset_div2 (e.g., the $t_c$ offset divided by two). In an embodiment, the PPS parameters are set as follows: if picture level QP 114 (e.g., an average picture level QP) is less than threshold 307, pps_beta_offset_div2 is set to 0 and pps_tc_offset_div2 is set to 0; otherwise, if picture level QP 114 is less than threshold 308, pps_beta_offset_div2 is set to c and pps_tc_offset_div2 is set to c; and otherwise, pps_beta_offset_div2 is set to 0 and pps_tc_offset_div2 is set to 0. The value of c may be any suitable predetermined value such as one or two or the like. In the discussed example, a value of c is used for both pps_beta_offset_div2 and pps_tc_offset_div2 when picture level QP 114 is between thresholds 307, 308. In other examples, different values may be used for pps_beta_offset_div2 and pps_tc_offset_div2. In an embodiment, pps_beta_offset_div2 is set to c and pps_tc_offset_div2 is set to another value when picture level QP 114 is between thresholds 307, 308.

In an embodiment, zones 304, 305, 306 include a low quantization parameter zone (e.g., zone 304) having deblock filter strength threshold β offset 309 and/or deblock filter strength threshold $t_c$ offset 310, a mid quantization parameter zone (e.g., zone 305) having deblock filter strength threshold β offset 311 and/or deblock filter strength threshold $t_c$ offset 312, and a high quantization parameter zone having deblock filter strength threshold β offset 313 and/or deblock filter strength threshold $t_c$ offset 314 such that deblock filter strength threshold β offset 311 is greater than both deblock filter strength threshold β offset 309 and deblock filter strength threshold β offset 313 and deblock filter strength threshold $t_c$ offset 312 is greater than both deblock filter strength threshold $t_c$ offset 310 and deblock filter strength threshold $t_c$ offset 314.

Returning to FIG. 1, as discussed, QP zone adaptive β and $t_c$ offset for picture module 105 determines which zone the picture level QP for the current picture is within and QP zone adaptive β and $t_c$ offset for picture module 105 selects the corresponding picture β and $t_c$ offsets 116 for the current picture. As shown, picture β and $t_c$ offsets 116 for the current picture are provided to encode and deblocking module 107, which uses picture β and $t_c$ offsets 116 for the generation of bitstream 118 and for the deblocking of a reference picture corresponding to the current picture. For example, encode and deblocking module 107 may encode indicators corresponding to picture β and $t_c$ offsets 116 into a bitstream picture header for the current picture of input video 111. In an embodiment, the indicators corresponding to picture β and $t_c$ offsets 116 are pps_beta_offset_div2 and pps_tc_offset_div2 as discussed herein. In an embodiment, the indicators corresponding to picture β and $t_c$ offsets 116 are values of picture β and $t_c$ offsets 116. Furthermore, encode and deblocking module 107 may deblock a reference picture corresponding to the current picture of input video 111 for storage in picture buffer 108 using picture β and $t_c$ offsets 116 as is discussed further herein below.

As discussed with respect to slice level QP analysis module 103, when no slices with differing QPs are detected or a single slice is used for the current picture, no slice level variations are made, or slice level QP zone adaptive β and $t_c$ offsetting has been bypassed, QP zone adaptive β and $t_c$ offsets are determined using the picture level QP by QP zone adaptive β and $t_c$ offset for picture module 105 to generate picture β and $t_c$ offsets 116. Alternatively, when slices having differing QPs are detected, QP zone adaptive β and $t_c$ offsets are determined using the slice level QPs by QP zone adaptive β and $t_c$ offset for slice module 106 to generate slice β and $t_c$ offsets 117.

For example, each slice level QP for each slice of the current picture as provided by slice level QPs 115 is within a range of available quantization parameters that is based on the codec being implemented by system 100 (e.g., the slice level QP is between zero or one and 51, inclusive). For example, the range of available quantization parameters for each slice may be the same as the range of available quantization parameters for the picture level QP as discussed above. In an embodiment, the range of available slice level quantization parameters (QP values) is segmented into multiple zones such that the zones are non-overlapping and collectively cover the entire range of available quantization parameters. Each zone is then assigned a corresponding preselected deblock filter strength threshold β offset and/or $t_c$ offset. During implementation, in response to the zone in which the current picture level QP falls, the corresponding preselected deblock filter strength threshold β offset and/or $t_c$ offset are assigned for the slice at the slice level. For example, QP zone adaptive β and $t_c$ offset for slice module 106 determines which zone the slice level QP for the current slice is within and QP zone adaptive β and $t_c$ offset for slice module 106 selects the corresponding slice β and $t_c$ offsets 117 for the current slice. Such operations are repeated for each slice of the current picture or for each slice of the current picture having a different QP with respect to picture level QP 114.

Such zone segmentation and assignment of deblock filter strength threshold β offsets and/or $t_c$ offsets may be provided using any suitable technique or techniques discussed herein with respect to picture level QP, picture level deblock filter strength threshold β offset and/or picture level $t_c$ offset and FIG. 3. With reference to FIG. 3, in an embodiment, the same number of zones, threshold values, deblock filter strength threshold β offsets, and deblock filter strength threshold $t_c$ offsets are used for the picture level and for the slice level. In other embodiments, different number of zones, threshold values, deblock filter strength threshold β offsets, and/or deblock filter strength threshold $t_c$ offsets may be used between the picture level and slice level. In an embodiment, the picture level has more zones (e.g., five to thirteen zones) than the slice level (e.g., three zones). In an embodiment, both the picture level and the slice level use three zones with the picture level deblock filter strength threshold β and $t_c$ offsets for the mid quantization parameter zone (i.e., zone 305) being greater than the slice level deblock filter strength threshold β and $t_c$ offsets for the mid quantization parameter zone (i.e., zone 305). In an embodiment, the picture level deblock filter strength threshold β and $t_c$ offsets for the mid quantization parameter zone are four (e.g., two when included as pps_beta_offset_div2 and pps_tc_offset_div2 in bitstream 118) and the slice level deblock filter strength threshold β and $t_c$ offsets for the mid quantization parameter zone are two (e.g., one when included as slice_beta_offset_div2 and slice_tc_offset_div2).

In some embodiments, such level preselected deblock filter strength threshold β and $t_c$ offsets may be implemented as pps_beta_offset_div2 (e.g., the β offset divided by two), pps_tc_offset_div2 (e.g., the $t_c$ offset divided by two), slice_beta_offset_div2 (e.g., the β offset divided by two), and slice_tc_offset_div2 (e.g., the $t_c$ offset divided by two). In an embodiment, the slice level parameters are set as follows: if a particular slice level QP of slice level QPs 115 (e.g., an average slice level QP) is less than threshold 307, slice_beta_offset_div2 is set to 0 and slice_tc_offset_div2 is set to 0; otherwise, if the particular slice level QP of slice level QPs 115 is less than threshold 308, slice_beta_offset_div2 is set to c and slice_tc_offset_div2 is set to c; and otherwise, slice_beta_offset_div2 is set to 0 and slice_tc_offset_div2 is set to 0 for the particular slice level QP of slice level QPs 115. Such processing may be repeated for each particular slice level QP of slice level QPs 115. The value of c may be any suitable predetermined value such as one or two or the like. In the discussed example, a value of c is used for both slice_beta_offset_div2 and slice_tc_offset_div2 when the particular slice level QP of slice level QPs 115 is between thresholds 307, 308. In other examples, different values may be used for slice_beta_offset_div2 and slice_tc_offset_div2 when a particular slice level QP of slice level QPs 115 is between thresholds 307, 308. For example, slice_beta_offset_div2 may be set to the value c and slice_tc_offset_div2 may be set to another value when a particular slice level QP of slice level QPs 115 is between thresholds 307, 308. For example, when certain slices use different QPs (e.g., as indicated by slice level QPs 115) with respect to the picture level QP (e.g., picture level QP 114), slice_beta_offset_div2 and slice_tc_offset_div2 override the values of pps_beta_offset_div2 and pps_tc_offset_div2.

Returning to FIG. 1, as discussed, QP zone adaptive β and $t_c$ offset for slice module 106 determines which zone each slice level QP for the current picture is within and QP zone adaptive β and $t_c$ offset for slice module 106 selects the corresponding slice β and $t_c$ offsets 117 for the slices of the current picture. As shown, slice β and $t_c$ offsets 117 for the current picture are provided to encode and deblocking module 107, which uses slice β and $t_c$ offsets 117 for the generation of bitstream 118 and for the deblocking of a reference picture corresponding to the current picture. For example, encode and deblocking module 107 may encode indicators corresponding to slice β and $t_c$ offsets 117 into a bitstream picture header for the current picture of input video 111. In an embodiment, the indicators corresponding to slice β and $t_c$ offsets 117 are slice_beta_offset_div2 and slice_tc_offset_div2 as discussed herein. In an embodiment, the indicators corresponding to slice β and $t_c$ offsets 117 are values of slice β and $t_c$ offsets 117. Furthermore, encode and deblocking module 107 may deblock a reference picture corresponding to the current picture of input video 111 for storage in picture buffer 108 using slice β and $t_c$ offsets 117 as is discussed further herein below.

Figure 4:
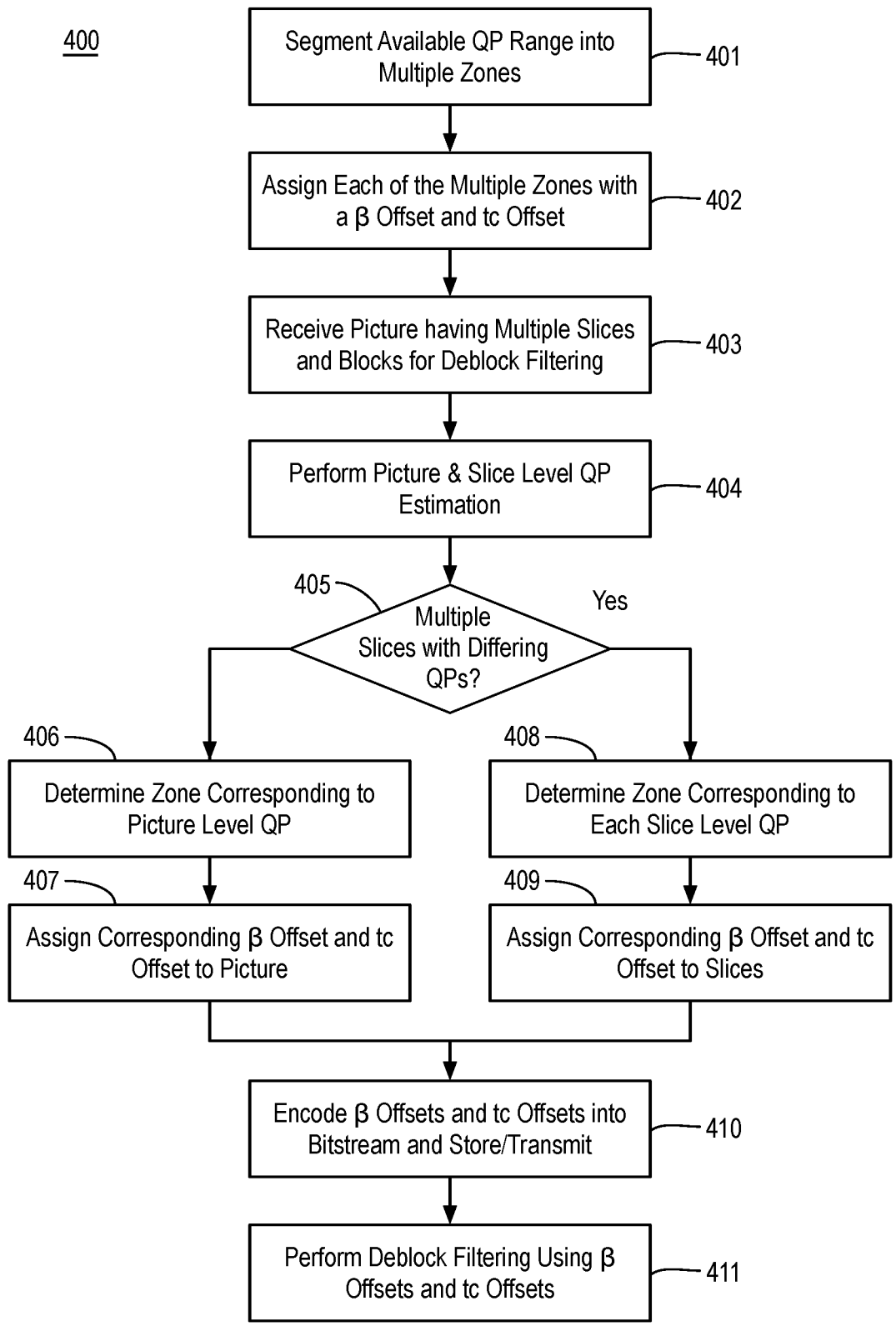
FIG. 4 is a flow diagram illustrating an example process for video coding including selecting adaptive control of deblock filtering threshold offsets.

FIG. 4 is a flow diagram illustrating an example process 400 for video coding including selecting adaptive control of deblock filtering threshold offsets, arranged in accordance with at least some implementations of the present disclosure. Process 400 may include one or more operations 401-411 as illustrated in FIG. 4. Process 400 may be performed by a device (e.g., system 100 as discussed herein) to encode input video. Process 400 or portions thereof may be performed at a picture level and process 400 may be repeated, in series or in parallel, for any number of pictures of input video.

Process 400 may begin at operation 401, where an available range of quantization parameters is segmented into multiple zones. The available range of quantization parameters may be any suitable range of quantization parameters such as the available quantization parameters provided by a video codec. The available range of quantization parameters may be segmented into multiple zones using any suitable technique or techniques. In an embodiment, each zone of the multiple zones includes multiple consecutive quantization parameters of the range of available quantization parameters. In an embodiment, the multiple zones are non-overlapping and collectively cover the entire range of available quantization parameters. In an embodiment, a first set of zones is provided for a picture level QP implementation and a second set of zones is provided for a slice level QP implementation. For example, the multiple zones may be provided using any characteristics discussed herein such as those discussed with respect to data structure 300.

Process 400 continues at operation 402, where each of the multiple zones established at operation 401 is assigned with a deblock filter strength threshold β offset and a deblock filter strength threshold $t_c$ offset. Each zone may be provided with a deblock filter strength threshold β offset and a deblock filter strength threshold $t_c$ offset using any suitable technique or techniques. In an embodiment, each zone of a first set of zones is provided with a deblock filter strength threshold β offset and a deblock filter strength threshold $t_c$ offset for a picture level QP implementation and a second set of zones is provided with a deblock filter strength threshold β offset and a deblock filter strength threshold $t_c$ offset for a slice level QP implementation. For example, the deblock filter strength threshold β offset and a deblock filter strength threshold $t_c$ offset may be provided using any characteristics discussed herein such as those discussed with respect to data structure 300.

Process 400 continues at operation 403, where a video picture optionally having multiple slices is received for processing. The video picture may be any suitable video picture discussed herein and may be received for processing using any suitable technique or techniques. In an embodiment, the video picture is retrieved from a frame buffer for processing. Process 400 continues at operation 404, where picture and slice level QP estimation is performed. The picture and slice level QP estimation may be performed using any suitable technique or techniques to provide a picture level QP for the video picture and, optionally, a slice level QP for each slice of the video picture. As discussed, the picture level QP and slice level QPs are within a range of available QPs as provided by the codec being implemented in process 400.

Process 400 continues at decision operation 405, where a determination is made as to whether one or more slices of the video picture have differing QPs with respect to the picture level QP. The determination as to whether one or more slices of the video picture have differing QPs with respect to the picture level QP may be made using any suitable technique or techniques. In an embodiment, each slice level QP is differenced with the picture level QP and if the difference exceeds a predetermined threshold, the slice level QP is deemed to differ with respect to the picture level QP. In an embodiment, when each slice level QP is within the predetermined threshold of the picture level quantization parameter, the slice level QPs are discarded for the purposes of determining deblock filter offsets (e.g., the slice level QPs are still used for coding) and adaptive deblock filter offset determination is performed using only the picture level QP as discussed with respect to operations 406, 407. In an embodiment, when one or more slice level QPs are outside of the predetermined threshold of the picture level quantization parameter, such slice level QPs are used for adaptive deblock filter offset determination as discussed with respect to operations 408, 409.

When no differing slice level QPs are detected (or no slice level variations are made, slice level QP zone offsetting has been bypassed, or a single slice is used for the current picture), process 400 continues at operation 406, where a determination is made as to which zone of the multiple zones of the available QP range established at operation 401 the picture level QP determined at operation 404 falls into. Such a determination may be made using any suitable technique or techniques. In an embodiment, the picture level QP is compared to a minimum available QP, threshold QP values establishing the zones, and the maximum available QP to determine which zone the picture level QP resides. Process 400 continues at operation 407, where the particular deblock filter strength threshold β offset and the particular deblock filter strength threshold $t_c$ offset corresponding to the particular zone determined at operation 406 are associated with the picture. The particular deblock filter strength threshold β offset and the particular deblock filter strength threshold $t_c$ offset may be determined using any suitable technique or techniques such as a look up table that associates zones to corresponding deblock filter strength threshold β offsets and deblock filter strength threshold $t_c$ offsets.

Returning to decision operation 405, when differing slice level QPs are detected, process 400 continues at operation 408, where a determination is made as to which zone of the multiple zones of the available QP range established at operation 401 each differing slice level QP determined at operation 404 falls into. In an embodiment, each slice level QP is compared to a minimum available QP, threshold QP values establishing the zones, and the maximum available QP to determine which zone the picture level QP resides. Process 400 continues at operation 409, where the particular deblock filter strength threshold β offset and the particular deblock filter strength threshold $t_c$ offset corresponding to each particular zone determined at operation 408 are associated with the appropriate slice. The particular deblock filter strength threshold β offset and the particular deblock filter strength threshold $t_c$ offset may be determined using any suitable technique or techniques such as a look up table that associates zones to corresponding deblock filter strength threshold β offsets and deblock filter strength threshold $t_c$ offsets. In an embodiment, operations 408, 409 are performed for each slice of the video picture and picture level deblock filter strength threshold β offset and deblock filter strength threshold $t_c$ offset determination may be skipped. In other embodiments, both sets of operations 406, 407 and operations 408, 409 are performed and both picture level and slice level deblock filter strength threshold β offsets and deblock filter strength threshold $t_c$ offsets are determined (and included in the bitstream). In operation, the offsets for the differing slices may override the picture level offsets for those slices while the non-differing slices may use the picture level offsets.

As shown in FIG. 4, processing continues from operation 407 and/or operation 409 at operation 410, where the deblock filter strength threshold β offset(s) and deblock filter strength threshold $t_c$ offset(s) are encoded into a bitstream, which may be stored and/or transmitted for storage or use by a decoder device. The deblock filter strength threshold β offset(s) and deblock filter strength threshold $t_c$ offset(s) may be encoded into a bitstream using any suitable technique or techniques. In an embodiment, picture level deblock filter strength threshold β offset(s) and deblock filter strength threshold $t_c$ offset(s) are encoded in a picture header (e.g., a PPS) and slice level deblock filter strength threshold β offset(s) and deblock filter strength threshold $t_c$ offset(s), if applicable, are encoded in a slice header. Such encoding may include insertion of the offsets and optional variable length encoding or the like.

Process 400 continues at operation 411, where the deblock filter strength threshold β offset(s) and deblock filter strength threshold $t_c$ offset(s) may be used for local deblock filtering such as local decode loop filtering. For example, an encoder implemented by system 100 (please refer to FIG. 1) may, via encode and deblocking module 107, perform deblock filtering of a reconstructed reference picture using the deblock filter strength threshold β offset(s) and deblock filter strength threshold $t_c$ offset(s) to generate deblocked picture 119, which may be stored in picture buffer 108. For example, an encoder may perform the same operations to generate a deblocked picture as a decoder. The decoder uses the deblocked picture or final picture (after other optional processing such as sample adaptive offset filtering) for presentment and as a reference picture for decoding other pictures. The encoder uses the deblocked picture or final picture as a reference picture for decoding other pictures. An example of such deblock filtering is discussed herein with respect to FIGS. 6-8.

Process 400 or portions thereof may be repeated any number of times either in series or in parallel for any number pictures or slices. As discussed, process 400 may provide for the adaptive determination of deblock filter strength threshold β offset(s) and deblock filter strength threshold $t_c$ offset(s) for use in adaptive deblock filtering. Furthermore, the deblock filter strength threshold β offset(s) and deblock filter strength threshold $t_c$ offset(s) may be encoded into a bitstream such as a standards compliant bitstream.

Figure 5:
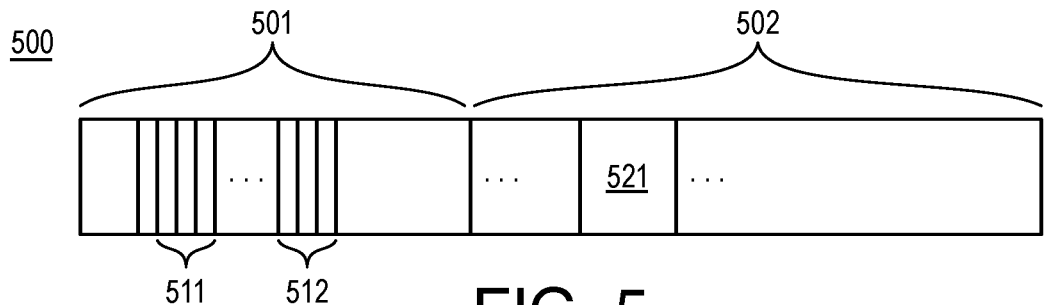
FIG. 5 illustrates an example bitstream.

FIG. 5 illustrates an example bitstream 500, arranged in accordance with at least some implementations of the present disclosure. In some examples, bitstream 500 may correspond to bitstream 118 as discussed with respect to FIG. 1. As shown in FIG. 5, in some embodiments, bitstream 500 may include a header portion 501 and a data portion 502. In an embodiment, header portion 501 includes a picture header 511 and a slice header 512. In an embodiment, both picture header 511 and slice header 512 are implemented via header portion 501. In an embodiment, picture header 511 and slice header 512 may be separated by a data portion.

In an embodiment, an indicator or indicators corresponding to a picture level deblock filter strength threshold β offset and/or a deblock filter strength threshold $t_c$ offset are implemented or inserted in picture header 511. In an embodiment, the picture level indicator or indicators include pps_beta_offset_div2 and pps_tc_offset_div2 as discussed herein. In an embodiment, the picture level indicator or indicators include the picture level deblock filter strength threshold β offset and/or a deblock filter strength threshold $t_c$ offset values discussed herein. Similarly, an indicator or indicators corresponding to slice level deblock filter strength threshold β offsets and/or deblock filter strength threshold $t_c$ offsets are implemented or inserted in slice header 512. In an embodiment, the slice level indicator or indicators include slice_beta_offset_div2 and slice_tc_offset_div2 as discussed herein. In an embodiment, the slice level indicator or indicators include the slice level deblock filter strength threshold β offset and/or a deblock filter strength threshold $t_c$ offset values discussed herein. Furthermore, data portion 502 may include encoded picture data 521 for coded pictures such that encoded picture data 521 includes, for example, encoded quantized transform coefficients, motion vectors, intra-prediction indicators, etc.

As discussed, the adaptive deblock filter strength threshold β offset and/or a deblock filter strength threshold $t_c$ offset values determined using techniques discussed herein may be used by an encoder (e.g., as implemented by system 100) to deblock filter a reconstructed picture. The following discussion corresponds to a particular implementation of the adaptive deblock filter strength threshold β offset and/or a deblock filter strength threshold $t_c$ offset values in deblock filtering. However, the adaptive deblock filter strength threshold β offset and/or a deblock filter strength threshold $t_c$ offset values may be used in deblock filtering using any suitable technique or techniques.

For example, with reference to FIG. 1, encode and deblocking module 107 or a deblocking component of encode and deblocking module 107 may receive a reconstructed reference picture for deblock filtering. The reconstructed reference picture may be generated using any suitable technique or techniques such as motion compensation techniques, intra-prediction techniques, encoded quantized transform coefficients inverse quantization and inverse transform techniques, and block and picture reconstruction techniques implemented as part of a local decode loop. Such techniques are known to those of skill in the art and are not presented for the sake of clarity of presentation. Deblock filtering may then be performed on a reconstructed picture as prescribed by a video standard such as AVC, HEVC, etc. As discussed herein, the deblock filter strength threshold β offset(s) and deblock filter strength threshold $t_c$ offset(s) are implemented as part of the operations to perform deblock filtering between adjacent blocks such that they vary deblock filter strength thresholds (e.g., β and $t_c$) for implementation of deblock filtering (e.g., whether filtering is to be applied, filter strength, etc.). For example, the AVC and HEVC standards provide a framework for determining whether two adjacent blocks are to be deblock filtered and, if so, the strength (e.g., filter length) of the filter to be applied.

Figure 6:
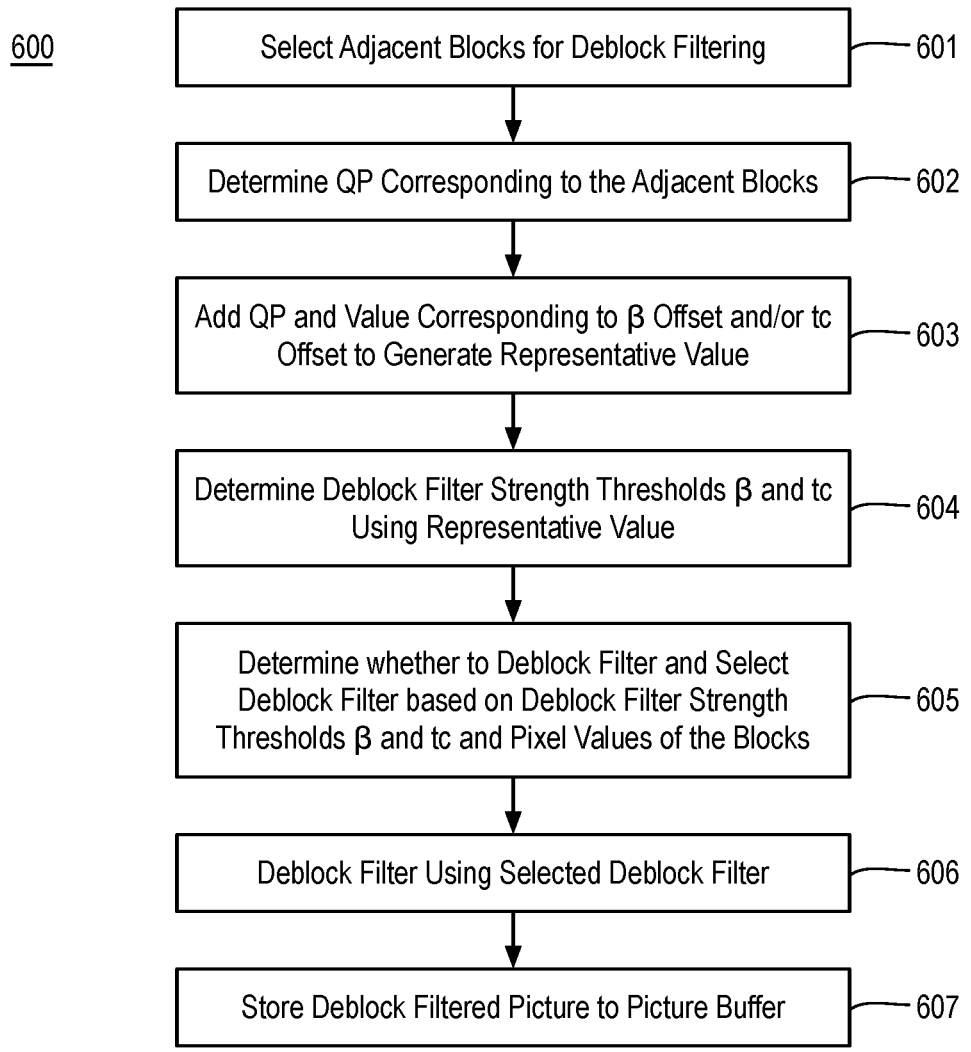
FIG. 6 is a flow diagram illustrating an example process for deblock filtering.

FIG. 6 is a flow diagram illustrating an example process 600 for deblock filtering, arranged in accordance with at least some implementations of the present disclosure. Process 600 may include one or more operations 601-607 as illustrated in FIG. 6. Process 400 may be performed by a device (e.g., system 100 as discussed herein) to deblock filter a reconstructed picture. Process 600 or portions thereof may be performed at a block level and process 600 may be repeated, in series or in parallel, for any number of blocks of a reconstructed picture.

Process 600 may begin at operation 601, where adjacent blocks of a reconstructed picture are selected for deblock filtering. For example, a reconstructed picture may be formed by, on a block by block basis selecting or generating a predicted block and adding thereto, if applicable, a reconstructed residual block and combining the reconstructed blocks into a reconstructed picture. Selected adjacent blocks may then be deblock filtered as discussed with respect to process 600. The selection of adjacent blocks for deblock filtering may be performed using any suitable technique or techniques.

Figures 7, 8:
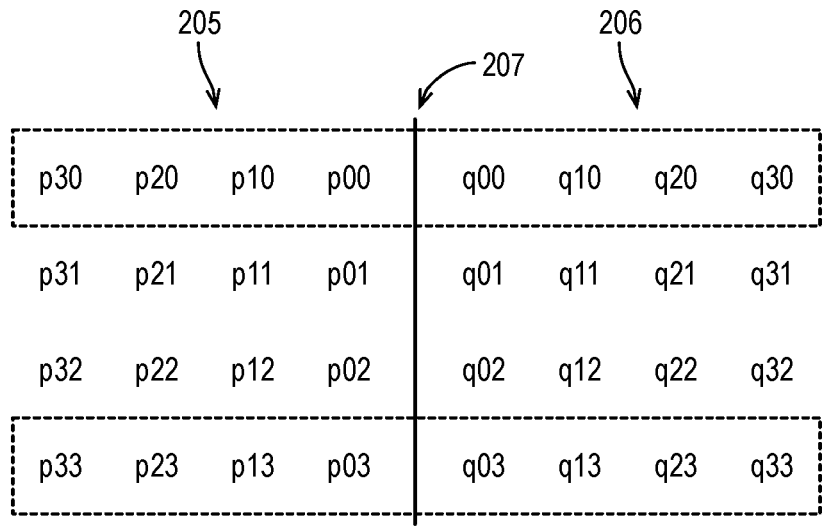
FIG. 7 illustrates example pixel values of example coding units.
FIG. 8 illustrates an example deblock filter strength threshold table.

Reference is now made to coding unit 205 and coding unit 206, which will be used for an exemplary application of deblock filtering. For example, coding units 205, 206 may be characterized as blocks to be deblock filtered in the following discussion and such terms block and coding unit will be used interchangeably. Furthermore, FIG. 7 illustrates example pixel values 700 of example coding units 205, 206, arranged in accordance with at least some implementations of the present disclosure. As shown, coding units 205, 206 are separated by vertical boundary 207 and coding units 205, 206 include pixel values 700 such that the pixel values of coding unit 205 are labeled as pixel values $p_{x,y}$ and the pixel values of coding unit 206 are indicated as pixel values $q_{x,y}$.

In an embodiment, process 600 may include the determination of a boundary strength (i.e., bS) between coding unit 205 and coding unit 206. For example, a boundary strength of boundary 207 may be evaluated based on the characteristics of coding of coding unit 205 and coding unit 206. For example, if at least one of coding unit 205 and coding unit 206 is intra coded, bS is 2; if at least one of coding unit 205 and coding unit 206 has non-zero residual coefficients and boundary 207 is a transform boundary, bS is 1; if an absolute differences between spatial motion vector components of coding unit 205 and coding unit 206 is >=1 integer pixel, bS=1; if motion compensated prediction for coding unit 205 and coding unit 206 refers to different pictures or the number of motion vectors is different for the blocks, bS=1; else bS=0. If the boundary strength is greater than 1, processing continues as discussed below and, if not, no deblock filtering is applied.

Process 600 continues at operation 602, where a quantization parameter corresponding to the adjacent blocks selected at operation 601 may be determined. For example, an average quantization parameter of the adjacent blocks may be determined at operation 602. Process 600 continues at operation 603, where the quantization parameter corresponding to the adjacent blocks is added to a value corresponding to the picture level or slice level deblock filter strength threshold β offset and/or the deblock filter strength threshold $t_c$ offset to generate a representative value or values for the blocks. For example, with reference to FIG. 2, if coding units 205, 206 have offsets corresponding to picture level QP 211, such offsets are used and, if coding units 205, 206 have offsets corresponding to slice level QP 212, such offsets are used.

Although discussed with respect to adding the deblock filter strength threshold β offset and deblock filter strength threshold $t_c$ offset to the quantization parameter corresponding to the adjacent blocks, the deblock filter strength threshold β offset and deblock filter strength threshold $t_c$ offset may offset the quantization parameter using any suitable technique or techniques such as multiplication, division, or subtraction. In an embodiment, the deblock filter strength threshold β offset and deblock filter strength threshold $t_c$ offset are added to the quantization parameter corresponding to the adjacent blocks as shown in Equations (1) and (2) as follows:

$$Q=\text{Clip3}(0,51,qP_L+\text{slice\_beta\_offset\_div2}<<1) \quad (1)$$

where Q is the representative value for deblock filter strength threshold β, $qP_L$ is the quantization parameter corresponding to the adjacent blocks (e.g., $qP_L$=average(QP block 1, QP block 2)), slice_beta_offset_div2 is a slice level deblock filter strength threshold β offset divided by two), the operation<<provides a bit shift, and the operation Clip3 provides $qP_L$+slice_beta_offset_div2<<1 clipped to a min of 0 and a max of 51. Although illustrated with respect to slice_beta_offset_div2, slice_beta_offset_div2 may be replaced with pps_beta_offset_div2 as applicable for the application of a picture level deblock filter strength threshold β offset.

$$Q=\text{Clip3}(0,53,qP_L+2*(bS-1)+\text{slice\_tc\_offset\_div2}<<1) \quad (2)$$

where Q is the representative value for deblock filter strength threshold $t_c$, $qP_L$ is the quantization parameter corresponding to the adjacent blocks, slice_tc_offset_div2 is the deblock filter strength threshold $t_c$ offset divided by two), bS is a boundary strength as discussed above, the operation<<provides a bit shift, and the operation Clip3 provides $qP_L$+2*(bS−1)+slice_tc_offset_div2<<1 clipped to a min of 0 and a max of 51. Although illustrated with respect to slice_tc_offset_div2, slice_tc_offset_div2 may be replaced with pps_tc_offset_div2 as applicable for the application of a picture level deblock filter strength threshold $t_c$ offset.

Process 600 continues at operation 604, where the representative values are used to determine a deblock filter strength threshold β and/or deblock filter strength threshold $t_c$. For example, the representative value, Q (from Equation (1)), for deblock filter strength threshold β may be used to determine a deblock filter strength threshold β and/or the representative value, Q (from Equation (2)), for deblock filter strength threshold $t_c$ may be used to determine a deblock filter strength threshold $t_c$. The representative values may be used to determine the deblock filter strength threshold β and/or deblock filter strength threshold $t_c$ using any suitable technique or techniques. In an embodiment, each representative value is used to access a table to determine a corresponding preliminary deblock filter strength threshold β' and/or preliminary deblock filter strength threshold $t_c'$, which may be modified by an applied bit depth to determine the resultant deblock filter strength threshold β and/or deblock filter strength threshold $t_c$. In an embodiment, the deblock filter strength threshold β and/or deblock filter strength threshold $t_c$ are determined as shown by the table illustrated in FIG. 8 and Equations (3) and (4) as shown below.

FIG. 8 illustrates an example deblock filter strength threshold table 800, arranged in accordance with at least some implementations of the present disclosure. As shown, table 800 provides preliminary deblock filter strength thresholds β' and preliminary deblock filter strength thresholds $t_c'$ that may be accessed according to their corresponding representative values, Q.

In an embodiment, the representative value, Q (from Equation (1)), for deblock filter strength threshold β may be used to determine a preliminary deblock filter strength threshold β' using table 800. Subsequently, Equation (3) as follows may be used to determine the deblock filter strength threshold β:

$$\beta=\beta'*(1<<(BitDepth_Y-8)) \quad (3)$$

where β is the deblock filter strength threshold, β' is the preliminary deblock filter strength threshold, $BitDepth_Y$ is a luma bit depth, and the operation<<provides a bit shift.

Similarly, in an embodiment, representative value, Q (from Equation (2)), for deblock filter strength threshold $t_c$ may be used to determine a preliminary deblock filter strength threshold $t_c'$ using table 800. Subsequently, Equation (4) as follows may be used to determine the deblock filter strength threshold $t_c$:

$$t_c=t_c'*(1<<(BitDepth_Y-8)) \quad (4)$$

where $t_c$ is the deblock filter strength threshold, $t_c \propto$ is the preliminary deblock filter strength threshold, $BitDepth_Y$ is a luma bit depth, and the operation<<provides a bit shift.

Returning to FIG. 6, process 600 continues at operation 605, where, deblock filter strength threshold β and/or deblock filter strength threshold $t_c$, a determination is made as to whether deblock filtering for the selected blocks is to be performed and, if so, the deblock filter strength for the filtering. The determination as to whether deblock filtering for the selected blocks is to be performed and, if so, the deblock filter strength for the filtering using deblock filter strength threshold β and/or deblock filter strength threshold $t_c$ may be performed using any suitable technique or techniques. With reference to FIG. 7, in an embodiment, an evaluation may be made as to how much the signal of pixel values 700 varies on both sides of boundary 207 deviates from a straight line. For example, the pixel values of the two blocks may be evaluated to determine how much they deviate from a straight line and the resultant measurement may be compared to deblock filter strength threshold β. If the resultant deviation from linearity measurement is less than the deblock filter strength threshold β, deblock filtering is applied. For example, a determination as to whether deblock filtering is to be applied may be provided as shown with respect to Equation (5) as follows:

$$|p_{2,0}-2p_{1,0}+p_{0,0}|+|p_{2,3}-2p_{1,3}+p_{0,3}|+|q_{2,0}-2g_{1,0}+q_{0,0}|+|q_{2,0}-2q_{1,0}+q_{0,0}|>\beta \quad (5)$$

where $p_{x,y}$ and $q_{x,y}$ are pixel values of coding unit 205 and coding unit 206 (please refer to FIG. 7) and β is the deblock filter strength threshold as discussed above. For example, the left side of Equation (5) may provide a measure as to the deviation of pixel values or signals from a straight line and the deviation may be compared to deblock filter strength threshold β such that if the deviation exceeds β, deblock filtering is applied and if not, deblock filtering is skipped.

Is deblock filtering is to be applied, a determination as to filter strength (e.g., the number of pixels to be changed during the deblock filtering) is made. The determination as to filter strength may be made using any suitable technique or techniques. In an embodiment, if a measure of spatial activity of the two blocks is less than the deblock filter strength threshold β divided by eight (e.g., β/8), a measurement of flatness of the signal on both sides of the boundary is less than the deblock filter strength threshold β divided by eight (e.g., β/8), and if a measurement of intensity difference of samples across the boundary is less than a deblock filter strength threshold $t_c$ multiplied by 2.5 (e.g., 2.5 $t_c$), a strong deblock filter is applied and, if not, a normal deblock filter is applied. For example, a determination as to filter strength may be provided as shown with respect to Equations (6), (7), and (8) as follows:

$$|p_{2,i}-2p_{1,i}+p_{0,i}|+|q_{2,i}-2q_{1,i}+q_{0,i}|<\beta/8 \quad (6)$$

$$|p_{3,i}-p_{0,i}|+|q_{3,i}-q_{0,i}|<\beta/8 \quad (7)$$

$$|p_{0,i}-q_{0,i}|<2.5t_c \quad (8)$$

where $p_{x,y}$ and $q_{x,y}$ are pixel values of coding unit 205 and coding unit 206 (please refer to FIG. 7) and β and $t_c$ are the deblock filter strength thresholds as discussed above. For example, the left side of Equation (6) may provide a measure of spatial activity of the adjacent blocks, the left side of Equation (7) may provide a measure of flatness of the signal on both sides of the boundary between the adjacent blocks, and the left side of Equation (8) may provide a measure of intensity difference of samples across the boundary between the adjacent blocks. As shown, if the measure of spatial activity of the adjacent blocks is less than the deblock filter strength threshold β divided by eight, the measure of flatness of the signal on both sides of the boundary between the adjacent blocks is less than the deblock filter strength threshold β divided by eight, and the measure of intensity difference of samples across the boundary between the adjacent blocks is less than the deblock filter strength threshold $t_c$ times 2.5, a stronger filter may be applied and if any is untrue, a normal filter may be applied. For example, a stronger filter may adjust six pixel values (e.g., three on each side of the boundary) and a normal filter may filter adjust four pixel values (e.g., two on each side of the boundary).

Process 600 continues at operation 606, where deblock filtering may be performed, if applicable, using the selected deblock filter. The deblock filtering may be performed using any suitable technique or techniques based on a filter strength or length selected at operation 605. Process 600 continues at operation 607, where the deblock filtered picture may be stored to a picture buffer for use as a reference frame. In an embodiment, operations 601-606 are repeated for any number of adjacent blocks to generate deblock filtered reference frame. As will be appreciated the deblock filtered reference picture may be further processed via SAO filtering or the like prior to storage in a picture buffer. As used herein, the term deblock filtered reference picture applies to a deblock filtered reference picture regardless of whether the picture goes through additional processing.

Figure 9:
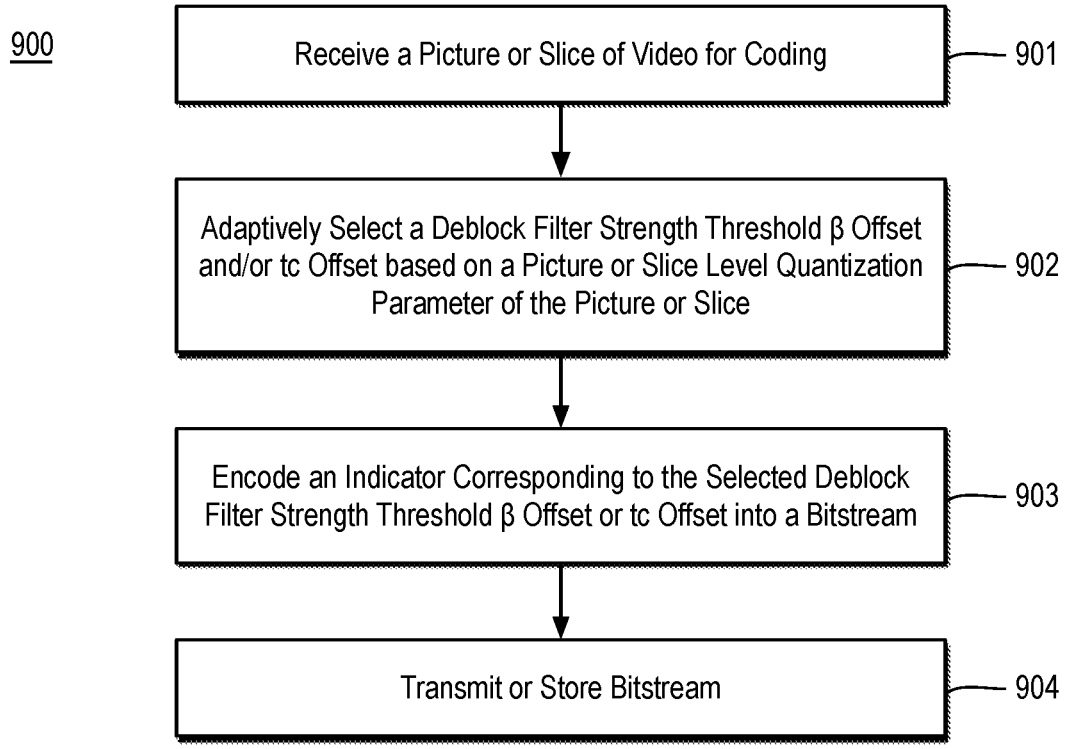
FIG. 9 is a flow diagram illustrating an example process for video coding including setting adaptive deblock filter strength threshold offsets.

FIG. 9 is a flow diagram illustrating an example process 900 for video coding including setting adaptive deblock filter strength threshold offsets, arranged in accordance with at least some implementations of the present disclosure. Process 900 may include one or more operations 901-904 as illustrated in FIG. 9. Process 900 may form at least part of a video coding process. By way of non-limiting example, process 900 may form at least part of a video coding process as performed by any device or system as discussed herein such as system 100. Furthermore, process 900 will be described herein with reference to system 1000 of FIG. 10.

Figure 10:
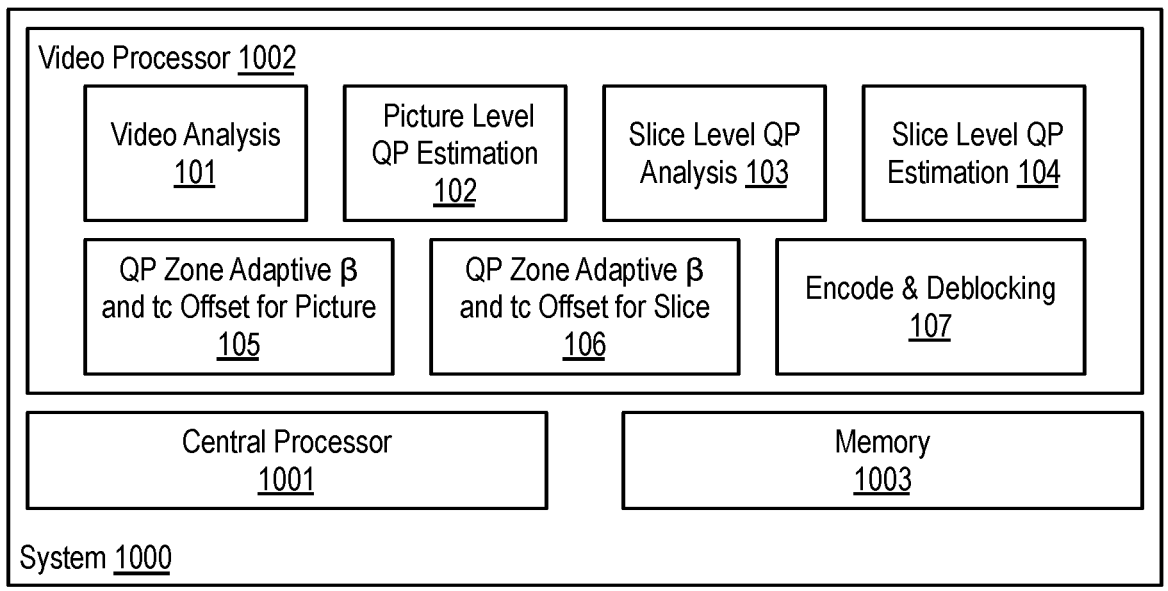
FIG. 10 is an illustrative diagram of an example system for video coding including setting adaptive deblock filter strength threshold offsets.

FIG. 10 is an illustrative diagram of an example system 1000 for video coding including setting adaptive deblock filter strength threshold offsets, arranged in accordance with at least some implementations of the present disclosure. As shown in FIG. 10, system 1000 may include a central processor 1001, a video processor 1002, and a memory 1003. Also as shown, video processor 1002 may include or implement video analysis module 101, picture level QP estimation module 102, slice level QP analysis module 103, slice level QP estimation module 104, QP zone adaptive β and $t_c$ offset for picture module 105, QP zone adaptive β and $t_c$ offset for slice module 106, and encode and deblocking module 107. In an embodiment, memory 1003 implements picture buffer 108. Furthermore, in the example of system 1000, memory 1003 may store video data or related content such as picture data, slice data, block data, quantization parameters, deblock filter strength thresholds, deblock filter strength threshold offsets, picture type data, deblock filtered picture data, bitstream data, and/or any other data as discussed herein.

As shown, in some embodiments, video analysis module 101, picture level QP estimation module 102, slice level QP analysis module 103, slice level QP estimation module 104, QP zone adaptive β and $t_c$ offset for picture module 105, QP zone adaptive β and $t_c$ offset for slice module 106, and encode and deblocking module 107 are implemented via video processor 1002. In other embodiments, one or more or portions of video analysis module 101, picture level QP estimation module 102, slice level QP analysis module 103, slice level QP estimation module 104, QP zone adaptive β and $t_c$ offset for picture module 105, QP zone adaptive β and $t_c$ offset for slice module 106, and encode and deblocking module 107 are implemented via central processor 1001 or another processing unit such as an image processor, a graphics processor, or the like.

Video processor 1002 may include any number and type of video, image, or graphics processing units that may provide the operations as discussed herein. Such operations may be implemented via software or hardware or a combination thereof. For example, video processor 1002 may include circuitry dedicated to manipulate pictures, picture data, or the like obtained from memory 1003. Central processor 1001 may include any number and type of processing units or modules that may provide control and other high level functions for system 1000 and/or provide any operations as discussed herein. Memory 1003 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1003 may be implemented by cache memory.

In an embodiment, one or more or portions of video analysis module 101, picture level QP estimation module 102, slice level QP analysis module 103, slice level QP estimation module 104, QP zone adaptive β and $t_c$ offset for picture module 105, QP zone adaptive β and $t_c$ offset for slice module 106, and encode and deblocking module 107 may be implemented via an execution unit (EU). The EU may include, for example, programmable logic or circuitry such as a logic core or cores that may provide a wide array of programmable logic functions. In an embodiment, one or more or portions of video analysis module 101, picture level QP estimation module 102, slice level QP analysis module 103, slice level QP estimation module 104, QP zone adaptive β and $t_c$ offset for picture module 105, QP zone adaptive β and $t_c$ offset for slice module 106, and encode and deblocking module 107 may be implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 9, process 900 may begin at operation 901, where a picture or slice of video is received for coding such that the picture or slice has a picture or slice level quantization parameter corresponding thereto and the picture or slice level quantization parameter is within a range of available quantization parameters as discussed herein. The picture or slice of video may be received for coding using any suitable technique or techniques and the picture or slice of video may include any suitable video. In an embodiment, the picture or slice level quantization parameter is determined based on a target bitrate or the like. The picture or slice level quantization parameter may be any suitable picture or slice level quantization parameter such as an average picture level quantization parameter or an average slice level quantization parameter for the corresponding picture or slice.

Processing may continue at operation 902, where a deblock filter strength threshold β offset or $t_c$ offset is selected based on the picture or slice level quantization parameter being within a particular zone of a plurality of zones of the range of available quantization parameters. For example, the range of available quantization parameters may be segmented into a plurality of zones such that each zone of the plurality of zones comprises multiple consecutive quantization parameters of the range of available quantization parameters. In an embodiment, the zones are non-overlapping and collectively cover the entire range of available quantization parameters. Furthermore, each zone has a preselected deblock filter strength threshold β offset or $t_c$ offset corresponding thereto.

The plurality of zones may include any number of zones and each zone may be associated with any suitable preselected deblock filter strength threshold β offset and/or $t_c$ offset. In an embodiment, the plurality of zones include a number of zones in the range of two to 13 zones, inclusive. In an embodiment, the plurality of zones include a low quantization parameter zone having a first deblock filter strength threshold β offset or $t_c$ offset, a mid quantization parameter zone having a second deblock filter strength threshold β offset or $t_c$ offset, and a high quantization parameter zone having a third deblock filter strength threshold β offset or $t_c$ offset, such that the second deblock filter strength threshold β offset or $t_c$ offset is greater than the first and third deblock filter strength threshold β offsets or $t_c$ offsets. That is, the mid quantization parameter zone may have the greatest deblock filter strength threshold β offset or $t_c$ offset with respect to all other zones. In an embodiment, second deblock filter strength threshold β offset or $t_c$ offset is an offset in the range of one to four, inclusive.

In an embodiment, the low quantization parameter zone includes quantization parameters available from a minimum available quantization parameter value through a first quantization parameter threshold, the mid quantization parameter zone includes quantization parameters from a next quantization parameter from the first quantization parameter threshold through a second quantization parameter threshold, and the high quantization parameter zone includes quantization parameters from a next quantization parameter from the second quantization parameter threshold through a maximum available quantization parameter value such that the first quantization parameter threshold is between 40% and 55% of a difference between the maximum and minimum available quantization parameter values and the second quantization parameter threshold is between 65% and 75% of the difference.

The deblock filter strength threshold β offset or $t_c$ offsets may be any suitable offsets for adjusting or offsetting the determination of a deblock filter strength threshold β or $t_c$ offset during deblock filtering. In an embodiment, the deblock filter strength threshold β offset is an offset for determining a deblock filter strength threshold β, which provides a spatial activity threshold to threshold a spatial activity of a first block and a second block of the picture or slice of video for deblock filtering. In an embodiment, the deblock filter strength threshold $t_c$ offset is an offset for determining a deblock filter strength threshold $t_c$, which provides a cross boundary difference threshold to threshold a difference in pixel values across a boundary between a first block and a second block of the picture or slice of video for deblock filtering.

As discussed, process 900 may implement adaptive deblock filtering based on a picture or slice level quantization parameter. In an embodiment, the video for coding comprises a picture having a picture level quantization parameter such that the picture comprises multiple slices, each having a slice level quantization parameter corresponding thereto, and process 900 further includes determining each slice level quantization parameter is within a predetermined threshold of the picture level quantization parameter, such that the selecting discussed with respect to operation 902 includes selecting the deblock filter strength threshold β offset or $t_c$ offset based on the picture quantization parameter and discarding the slice level quantization parameters in response to each slice level quantization parameter being within the predetermined threshold of the picture level quantization parameter.

In an embodiment, the video for coding comprises a picture having a picture level quantization parameter such that the picture includes multiple slices each having a slice level quantization parameter corresponding thereto and process 900 further includes determining a first slice of the multiple slices has a first slice level quantization parameter that is outside of a predetermined threshold of the picture level quantization parameter such that the selecting discussed with respect to operation 902 includes selecting the deblock filter strength threshold β offset or $t_c$ offset based on the picture quantization parameter and process 900 further includes encoding the deblock filter strength threshold β offset or the deblock filter strength threshold $t_c$ offset into a picture header, selecting a second deblock filter strength threshold β offset or a second deblock filter strength threshold $t_c$ offset based on the first slice level quantization parameter, and encoding the second selected deblock filter strength threshold β offset or the second selected deblock filter strength threshold $t_c$ offset into a bitstream header corresponding to the first slice. For example, such encoding of the deblock filter strength threshold β offset or the deblock filter strength threshold $t_c$ offset into the picture header and encoding the second selected deblock filter strength threshold β offset or the second selected deblock filter strength threshold $t_c$ offset into the bitstream header corresponding to the first slice may be performed as discussed with respect to operation 903 herein.

Processing may continue at operation 903, where an indicator corresponding to the selected deblock filter strength threshold β offset or $t_c$ offset is encoded into a bitstream picture or slice header for the picture or slice of video. The indicator corresponding to the selected deblock filter strength threshold β offset or $t_c$ offset may include any suitable value or indicator and the indicator may be encoded into the bitstream using any suitable technique or techniques. In an embodiment, the indicator is the selected deblock filter strength threshold β offset or $t_c$ offset divided by two (e.g., pps_beta_offset_div2, slice_beta_offset_div2, pps_tc_offset_div2, or slice_tc_offset_div2 as discussed herein). In an embodiment, the indicator is the value of the selected deblock filter strength threshold β offset or $t_c$ offset. In some embodiments, the indicator may be entropy encoded into the bitstream. The resultant bitstream may be any suitable bitstream such as an HEVC compliant bitstream, an AVC compliant bitstream, a VP9 compliant bitstream, etc.

Processing may continue at operation 904, where the bitstream is transmitted and/or stored. The bitstream may be transmitted and/or stored using any suitable technique or techniques. In an embodiment, the bitstream is stored in a local memory such as memory 1003. In an embodiment, the bitstream is transmitted for storage at a hosting device such as a server. In an embodiment, the bitstream is transmitted by system 1000 or a server for use by a decoder device.

In some embodiments, process 900 may further include performing deblock filtering for adjacent blocks using the selected deblock filter strength threshold β offset or $t_c$ offset. In an embodiment, the picture or slice of video received at operation 901 includes a first block adjacent to a second block and process 900 further includes determining a second quantization parameter corresponding to the first and second blocks (e.g., an average of a QP for the first block and a QP for the second block), adding the second quantization parameter and a value corresponding to the deblock filter strength threshold β offset or $t_c$ offset to generate a representative value (e.g., Q as discussed with respect to Equations (1) and (2)), determining a deblock filter strength threshold β or $t_c$ based on the representative value (e.g., as discussed with respect to table 800 and Equations (3) and (4)), selecting a deblock filter based on the deblock filter strength threshold β or $t_c$ and pixel values of the first and second blocks (e.g., as discussed with respect to Equations (6), (7), and (8)), deblock filtering first and second reconstructed blocks using the selected deblock filter to generate a deblock filtered picture or slice of video, and storing the deblock filtered picture or slice of video to a picture buffer.

Process 900 may be repeated any number of times either in series or in parallel for any number pictures or slices or the like. As discussed, process 900 may provide for video encoding including setting adaptive deblock filter strength threshold offsets.

Various components of the systems described herein may be implemented in software, firmware, and/or hardware and/or any combination thereof. For example, various components of the systems or devices discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 11:
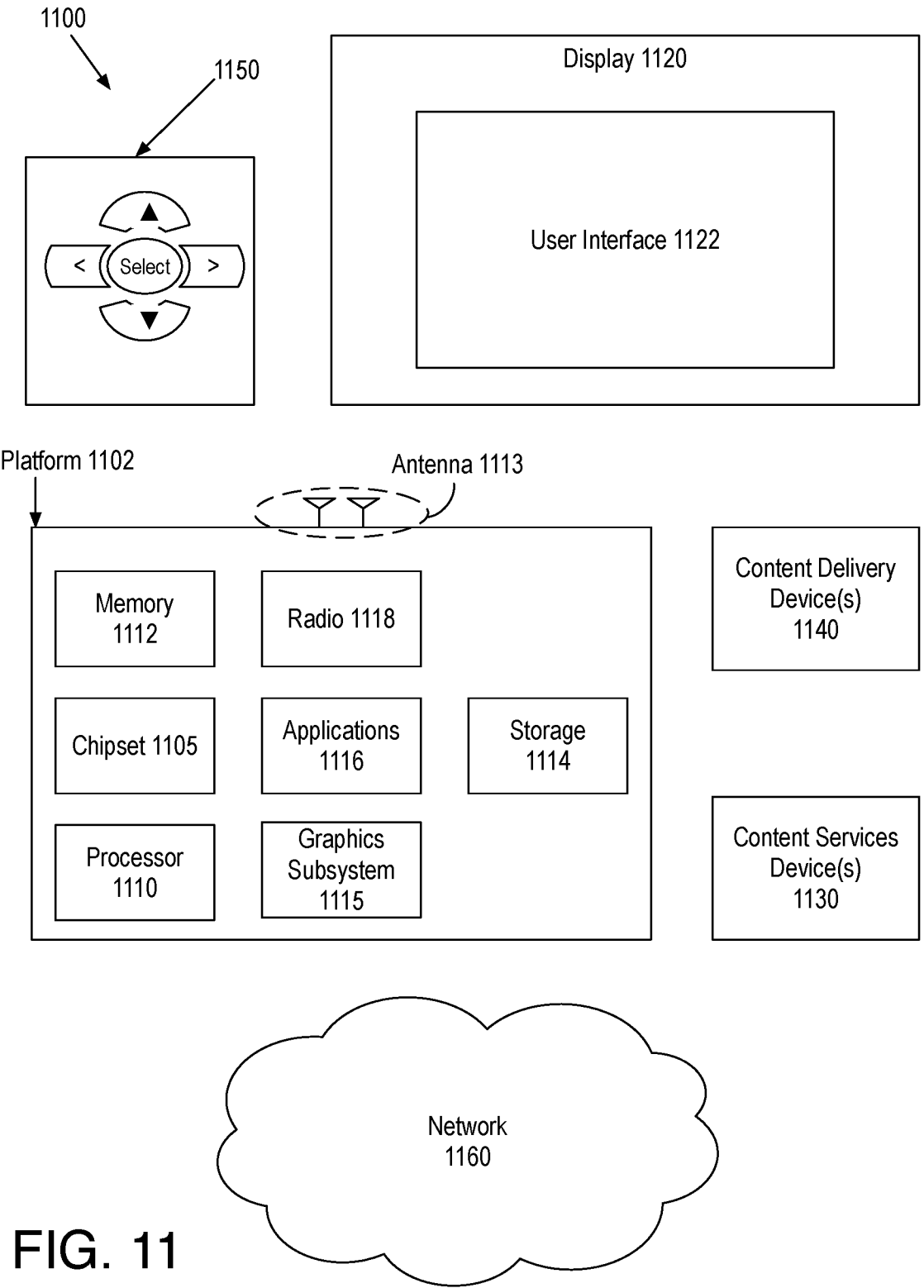
FIG. 11 is an illustrative diagram of an example system.

FIG. 11 is an illustrative diagram of an example system 1100, arranged in accordance with at least some implementations of the present disclosure. In various implementations, system 1100 may be a mobile system although system 1100 is not limited to this context. For example, system 1100 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1100 includes a platform 1102 coupled to a display 1120. Platform 1102 may receive content from a content device such as content services device(s) 1130 or content delivery device(s) 1140 or other similar content sources. A navigation controller 1150 including one or more navigation features may be used to interact with, for example, platform 1102 and/or display 1120. Each of these components is described in greater detail below.

In various implementations, platform 1102 may include any combination of a chipset 1105, processor 1110, memory 1112, antenna 1113, storage 1114, graphics subsystem 1115, applications 1116 and/or radio 1118. Chipset 1105 may provide intercommunication among processor 1110, memory 1112, storage 1114, graphics subsystem 1115, applications 1116 and/or radio 1118. For example, chipset 1105 may include a storage adapter (not depicted) capable of providing intercommunication with storage 1114.

Processor 1110 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1110 may be dual-core processor(s), dual-core mobile processor(s), and so forth.

Memory 1112 may be implemented as a volatile memory device such as, but not limited to, a Random Access Memory (RAM), Dynamic Random Access Memory (DRAM), or Static RAM (SRAM).

Storage 1114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1114 may include technology to increase the storage performance enhanced protection for valuable digital media when multiple hard drives are included, for example.

Graphics subsystem 1115 may perform processing of images such as still or video for display. Graphics subsystem 1115 may be a graphics processing unit (GPU) or a visual processing unit (VPU), for example. An analog or digital interface may be used to communicatively couple graphics subsystem 1115 and display 1120. For example, the interface may be any of a High-Definition Multimedia Interface, DisplayPort, wireless HDMI, and/or wireless HD compliant techniques. Graphics subsystem 1115 may be integrated into processor 1110 or chipset 1105. In some implementations, graphics subsystem 1115 may be a stand-alone device communicatively coupled to chipset 1105.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1118 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1118 may operate in accordance with one or more applicable standards in any version.

In various implementations, display 1120 may include any television type monitor or display. Display 1120 may include, for example, a computer display screen, touch screen display, video monitor, television-like device, and/or a television. Display 1120 may be digital and/or analog. In various implementations, display 1120 may be a holographic display. Also, display 1120 may be a transparent surface that may receive a visual projection. Such projections may convey various forms of information, images, and/or objects. For example, such projections may be a visual overlay for a mobile augmented reality (MAR) application. Under the control of one or more software applications 1116, platform 1102 may display user interface 1122 on display 1120.

In various implementations, content services device(s) 1130 may be hosted by any national, international and/or independent service and thus accessible to platform 1102 via the Internet, for example. Content services device(s) 1130 may be coupled to platform 1102 and/or to display 1120. Platform 1102 and/or content services device(s) 1130 may be coupled to a network 1160 to communicate (e.g., send and/or receive) media information to and from network 1160. Content delivery device(s) 1140 also may be coupled to platform 1102 and/or to display 1120.

In various implementations, content services device(s) 1130 may include a cable television box, personal computer, network, telephone, Internet enabled devices or appliance capable of delivering digital information and/or content, and any other similar device capable of uni-directionally or bi-directionally communicating content between content providers and platform 1102 and/or display 1120, via network 1160 or directly. It will be appreciated that the content may be communicated uni-directionally and/or bi-directionally to and from any one of the components in system 1100 and a content provider via network 1160. Examples of content may include any media information including, for example, video, music, medical and gaming information, and so forth.

Content services device(s) 1130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1102 may receive control signals from navigation controller 1150 having one or more navigation features. The navigation features of may be used to interact with user interface 1122, for example. In various embodiments, navigation may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of may be replicated on a display (e.g., display 1120) by movements of a pointer, cursor, focus ring, or other visual indicators displayed on the display. For example, under the control of software applications 1116, the navigation features located on navigation may be mapped to virtual navigation features displayed on user interface 1122, for example. In various embodiments, may not be a separate component but may be integrated into platform 1102 and/or display 1120. The present disclosure, however, is not limited to the elements or in the context shown or described herein.

In various implementations, drivers (not shown) may include technology to enable users to instantly turn on and off platform 1102 like a television with the touch of a button after initial boot-up, when enabled, for example. Program logic may allow platform 1102 to stream content to media adaptors or other content services device(s) 1130 or content delivery device(s) 1140 even when the platform is turned "off." In addition, chipset 1105 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1100 may be integrated. For example, platform 1102 and content services device(s) 1130 may be integrated, or platform 1102 and content delivery device(s) 1140 may be integrated, or platform 1102, content services device(s) 1130, and content delivery device(s) 1140 may be integrated, for example. In various embodiments, platform 1102 and display 1120 may be an integrated unit. Display 1120 and content service device(s) 1130 may be integrated, or display 1120 and content delivery device(s) 1140 may be integrated, for example. These examples are not meant to limit the present disclosure.

In various embodiments, system 1100 may be implemented as a wireless system, a wired system, or a combination of both. When implemented as a wireless system, system 1100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 11.

Figure 12:
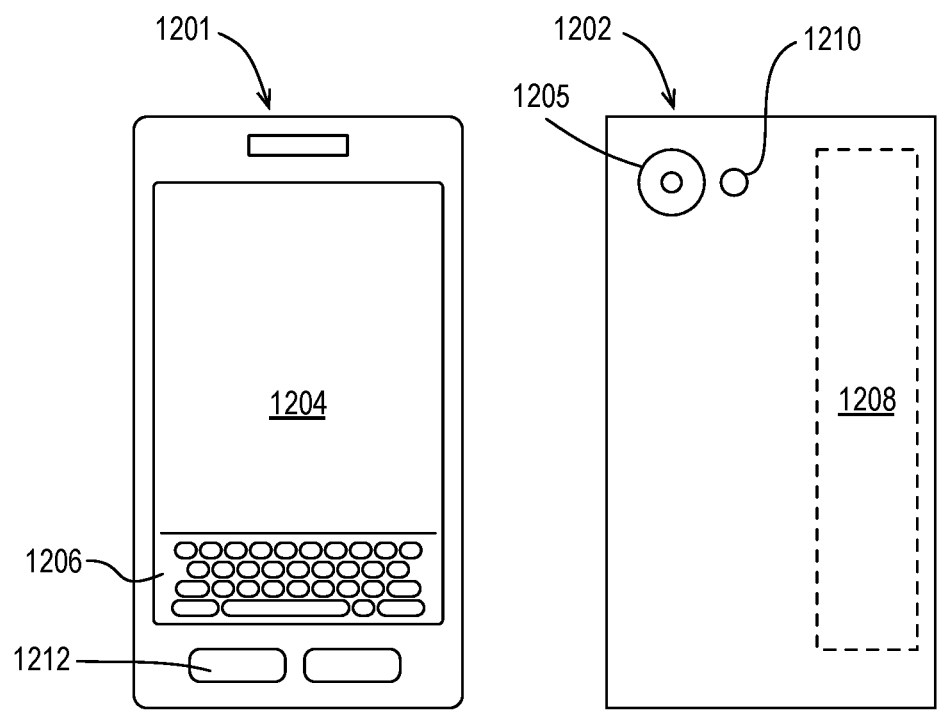
FIG. 12 illustrates an example device, all arranged in accordance with at least some implementations of the present disclosure.

As described above, system 1100 may be embodied in varying physical styles or form factors. FIG. 12 illustrates an example small form factor device 1200, arranged in accordance with at least some implementations of the present disclosure. In some examples, system 1100 may be implemented via device 1200. In other examples, system 100 or portions thereof may be implemented via device 1200. In various embodiments, for example, device 1200 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 12, device 1200 may include a housing with a front 1201 and a back 1202. Device 1200 includes a display 1204, an input/output (I/O) device 1206, and an integrated antenna 1208. Device 1200 also may include navigation features 1212. I/O device 1206 may include any suitable I/O device for entering information into a mobile computing device. Examples for I/O device 1206 may include an alphanumeric keyboard, a numeric keypad, a touch pad, input keys, buttons, switches, microphones, speakers, voice recognition device and software, and so forth. Information also may be entered into device 1200 by way of microphone (not shown), or may be digitized by a voice recognition device. As shown, device 1200 may include a camera 1205 (e.g., including a lens, an aperture, and an imaging sensor) and a flash 1210 integrated into back 1202 (or elsewhere) of device 1200. In other examples, camera 1205 and flash 1210 may be integrated into front 1201 of device 1200 or both front and back cameras may be provided. Camera 1205 and flash 1210 may be components of a camera module to originate image data processed into streaming video that is output to display 1204 and/or communicated remotely from device 1200 via antenna 1208 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following embodiments pertain to further embodiments.

In one or more first embodiments, a computer-implemented method for video coding comprises receiving a picture or slice of video for coding such that the picture or slice has a picture or slice level quantization parameter corresponding thereto the picture or slice level quantization parameter is within a range of available quantization parameters, selecting a deblock filter strength threshold β offset or $t_c$ offset based on the picture or slice level quantization parameter being within a particular zone of a plurality of zones of the range of available quantization parameters such that each zone of the plurality of zones comprises multiple consecutive quantization parameters of the range of available quantization parameters and wherein each zone has a preselected deblock filter strength threshold β offset or $t_c$ offset corresponding thereto, encoding an indicator corresponding to the selected deblock filter strength threshold β offset or $t_c$ offset into a bitstream picture or slice header for the picture or slice of video, and transmitting or storing the bitstream.

In one or more second embodiments, further to the first embodiments, the zones are non-overlapping and collectively cover the entire range of available quantization parameters.

In one or more third embodiments, further to any of the first or second embodiments, the plurality of zones comprise a low quantization parameter zone having a first deblock filter strength threshold β offset or $t_c$ offset, a mid quantization parameter zone having a second deblock filter strength threshold β offset or $t_c$ offset, and a high quantization parameter zone having a third deblock filter strength threshold β offset or $t_c$ offset such that the second deblock filter strength threshold β offset or $t_c$ offset is greater than the first and third deblock filter strength threshold β offsets or $t_c$ offsets.

In one or more fourth embodiments, further to any of the first through third embodiments, the second deblock filter strength threshold β offset or $t_c$ offset is an offset in the range of one to four, inclusive.

In one or more fifth embodiments, further to any of the first through fourth embodiments, the low quantization parameter zone consists of quantization parameters available from a minimum available quantization parameter value through a first quantization parameter threshold, the mid quantization parameter zone consists of quantization parameters from a next quantization parameter from the first quantization parameter threshold through a second quantization parameter threshold, and the high quantization parameter zone consists of quantization parameters from a next quantization parameter from the second quantization parameter threshold through a maximum available quantization parameter value such that the first quantization parameter threshold is between 40% and 55% of a difference between the maximum and minimum available quantization parameter values and the second quantization parameter threshold is between 65% and 75% of the difference.

In one or more sixth embodiments, further to any of the first through fifth embodiments, the plurality of zones consist of a number of zones in the range of two to 13 zones, inclusive.

In one or more seventh embodiments, further to any of the first through sixth embodiments, the deblock filter strength threshold β offset comprises an offset for determining a deblock filter strength threshold β, which comprises a spatial activity threshold to threshold a spatial activity of a first block and a second block of the picture or slice of video for deblock filtering.

In one or more eighth embodiments, further to any of the first through seventh embodiments, the deblock filter strength threshold $t_c$ offset comprises an offset for determining a deblock filter strength threshold $t_c$, which comprises a cross boundary difference threshold to threshold a difference in pixel values across a boundary between a first block and a second block of the picture or slice of video for deblock filtering.

In one or more ninth embodiments, further to any of the first through eighth embodiments, the video for coding comprises the picture having a picture level quantization parameter and the picture comprises multiple slices each having a slice level quantization parameter corresponding thereto, and the method further comprises determining each slice level quantization parameter is within a predetermined threshold of the picture level quantization parameter, wherein said selecting comprises selecting the deblock filter strength threshold β offset or $t_c$ offset based on the picture quantization parameter.

In one or more tenth embodiments, further to any of the first through ninth embodiments, the video for coding comprises the picture having a picture level quantization parameter and the picture comprises multiple slices each having a slice level quantization parameter corresponding thereto, and the method further comprises determining a first slice of the multiple slices has a first slice level quantization parameter that is outside of a predetermined threshold of the picture level quantization parameter, wherein said selecting comprises selecting the deblock filter strength threshold β offset or the deblock filter strength threshold $t_c$ offset based on the picture quantization parameter and said encoding comprises encoding the deblock filter strength threshold β offset or the deblock filter strength threshold $t_c$ offset into a picture header, selecting a second deblock filter strength threshold β offset or a second deblock filter strength threshold $t_c$ offset based on the first slice level quantization parameter, and encoding the second selected deblock filter strength threshold β offset or the second selected deblock filter strength threshold $t_c$ offset into a bitstream header corresponding to the first slice.

In one or more eleventh embodiments, further to any of the first through tenth embodiments, the picture or slice of video comprises a first block adjacent to a second block, and the method further comprises determining a second quantization parameter corresponding to the first and second blocks, adding the second quantization parameter and a value corresponding to the deblock filter strength threshold β offset or $t_c$ offset to generate a representative value, determining a deblock filter strength threshold β or $t_c$ based on the representative value, selecting a deblock filter based on the deblock filter strength threshold β or $t_c$ and pixel values of the first and second blocks, deblock filtering first and second reconstructed blocks using the selected deblock filter to generate a deblock filtered picture or slice of video, and storing the deblock filtered picture or slice of video to a picture buffer.

In one or more twelfth embodiments, system for video coding comprises a memory to store a picture or slice of video such that the picture or slice has a picture or slice level quantization parameter corresponding thereto and the picture or slice level quantization parameter is within a range of available quantization parameters, and a processor coupled to the memory, the processor to select a deblock filter strength threshold β offset or $t_c$ offset based on the picture or slice level quantization parameter being within a particular zone of a plurality of zones of the range of available quantization parameters such that each zone of the plurality of zones comprises multiple consecutive quantization parameters of the range of available quantization parameters and each zone has a preselected deblock filter strength threshold β offset or $t_c$ offset corresponding thereto, and to encode an indicator corresponding to the selected deblock filter strength threshold β offset or $t_c$ offset into a bitstream picture or slice header for the picture or slice of video.

In one or more thirteenth embodiments, further to the twelfth embodiments, the zones are non-overlapping and collectively cover the entire range of available quantization parameters.

In one or more fourteenth embodiments, further to any of the twelfth or thirteenth embodiments, the plurality of zones comprise a low quantization parameter zone having a first deblock filter strength threshold β offset or $t_c$ offset, a mid quantization parameter zone having a second deblock filter strength threshold β offset or $t_c$ offset, and a high quantization parameter zone having a third deblock filter strength threshold β offset or $t_c$ offset, wherein the second deblock filter strength threshold β offset or $t_c$ offset is greater than the first and third deblock filter strength threshold β offsets or $t_c$ offsets.

In one or more fifteenth embodiments, further to any of the twelfth through fourteenth embodiments, the second deblock filter strength threshold β offset or $t_c$ offset is an offset in the range of one to four, inclusive.

In one or more sixteenth embodiments, further to any of the twelfth through fifteenth embodiments, the low quantization parameter zone consists of quantization parameters available from a minimum available quantization parameter value through a first quantization parameter threshold, the mid quantization parameter zone consists of quantization parameters from a next quantization parameter from the first quantization parameter threshold through a second quantization parameter threshold, and the high quantization parameter zone consists of quantization parameters from a next quantization parameter from the second quantization parameter threshold through a maximum available quantization parameter value such that the first quantization parameter threshold is between 40% and 55% of a difference between the maximum and minimum available quantization parameter values and the second quantization parameter threshold is between 65% and 75% of the difference.

In one or more seventeenth embodiments, further to any of the twelfth through sixteenth embodiments, the plurality of zones consist of a number of zones in the range of two to 13 zones, inclusive.

In one or more eighteenth embodiments, further to any of the twelfth through seventeenth embodiments, wherein the deblock filter strength threshold β offset comprises an offset for determining a deblock filter strength threshold β, which comprises a spatial activity threshold to threshold a spatial activity of a first block and a second block of the picture or slice of video for deblock filtering.

In one or more nineteenth embodiments, further to any of the twelfth through eighteenth embodiments, the deblock filter strength threshold $t_c$ offset comprises an offset for determining a deblock filter strength threshold $t_c$, which comprises a cross boundary difference threshold to threshold a difference in pixel values across a boundary between a first block and a second block of the picture or slice of video for deblock filtering.

In one or more twentieth embodiments, further to any of the twelfth through nineteenth embodiments, the video for coding comprises the picture having a picture level quantization parameter, the picture comprises multiple slices each having a slice level quantization parameter corresponding thereto, and the processor is further to determine each slice level quantization parameter is within a predetermined threshold of the picture level quantization parameter, wherein said selecting comprises selecting the deblock filter strength threshold β offset or $t_c$ offset based on the picture quantization parameter.

In one or more twenty-first embodiments, further to any of the twelfth through twentieth embodiments, the video for coding comprises the picture having a picture level quantization parameter, the picture comprises multiple slices each having a slice level quantization parameter corresponding thereto, and the processor is further to determine a first slice of the multiple slices has a first slice level quantization parameter that is outside of a predetermined threshold of the picture level quantization parameter, such that the processor to select comprises the processor to select the deblock filter strength threshold β offset or the deblock filter strength threshold $t_c$ offset based on the picture quantization parameter and the processor to encode comprises the processor to encode the deblock filter strength threshold β offset or the deblock filter strength threshold $t_c$ offset into a picture header.

In one or more twenty-second embodiments, further to any of the twelfth through twenty-first embodiments, the picture or slice of video comprises a first block adjacent to a second block, and the processor is further to determine a second quantization parameter corresponding to the first and second blocks, to add the second quantization parameter and a value corresponding to the deblock filter strength threshold β offset or $t_c$ offset to generate a representative value, to determine a deblock filter strength threshold β or $t_c$ based on the representative value, to select a deblock filter based on the deblock filter strength threshold β or $t_c$ and pixel values of the first and second blocks, to deblock filter first and second reconstructed blocks using the selected deblock filter to generate a deblock filtered picture or slice of video, and to store the deblock filtered picture or slice of video to a picture buffer.

In one or more twenty-third embodiments, a system comprises means for receiving a picture or slice of video for coding such that the picture or slice has a picture or slice level quantization parameter corresponding thereto and the picture or slice level quantization parameter is within a range of available quantization parameters, means for selecting a deblock filter strength threshold β offset or $t_c$ offset based on the picture or slice level quantization parameter being within a particular zone of a plurality of zones of the range of available quantization parameters such that each zone of the plurality of zones comprises multiple consecutive quantization parameters of the range of available quantization parameters and each zone has a preselected deblock filter strength threshold β offset or $t_c$ offset corresponding thereto, means for encoding an indicator corresponding to the selected deblock filter strength threshold β offset or $t_c$ offset into a bitstream picture or slice header for the picture or slice of video, and means for transmitting or means for storing the bitstream.

In one or more twenty-fourth embodiments, further to the twenty-third embodiments, the plurality of zones comprise a low quantization parameter zone having a first deblock filter strength threshold β offset or $t_c$ offset, a mid quantization parameter zone having a second deblock filter strength threshold β offset or $t_c$ offset, and a high quantization parameter zone having a third deblock filter strength threshold β offset or $t_c$ offset, wherein the second deblock filter strength threshold β offset or $t_c$ offset is greater than the first and third deblock filter strength threshold β offsets or $t_c$ offsets.

In one or more twenty-fifth embodiments, at least one machine readable medium comprising a plurality of instructions that, in response to being executed on a computing device, cause the computing device to perform video coding by receiving a picture or slice of video for coding such that the picture or slice has a picture or slice level quantization parameter corresponding thereto the picture or slice level quantization parameter is within a range of available quantization parameters, selecting a deblock filter strength threshold β offset or $t_c$ offset based on the picture or slice level quantization parameter being within a particular zone of a plurality of zones of the range of available quantization parameters such that each zone of the plurality of zones comprises multiple consecutive quantization parameters of the range of available quantization parameters and wherein each zone has a preselected deblock filter strength threshold β offset or $t_c$ offset corresponding thereto, encoding an indicator corresponding to the selected deblock filter strength threshold β offset or $t_c$ offset into a bitstream picture or slice header for the picture or slice of video, and transmitting or storing the bitstream.

In one or more twenty-sixth embodiments, further to the twenty-fifth embodiments, the plurality of zones comprise a low quantization parameter zone having a first deblock filter strength threshold β offset or $t_c$ offset, a mid quantization parameter zone having a second deblock filter strength threshold β offset or $t_c$ offset, and a high quantization parameter zone having a third deblock filter strength threshold β offset or $t_c$ offset, such that the second deblock filter strength threshold β offset or $t_c$ offset is greater than the first and third deblock filter strength threshold β offsets or $t_c$ offsets.

In one or more twenty-seventh embodiments, further to any of the twenty-fifth or twenty-sixth embodiments, the low quantization parameter zone consists of quantization parameters available from a minimum available quantization parameter value through a first quantization parameter threshold, the mid quantization parameter zone consists of quantization parameters from a next quantization parameter from the first quantization parameter threshold through a second quantization parameter threshold, and the high quantization parameter zone consists of quantization parameters from a next quantization parameter from the second quantization parameter threshold through a maximum available quantization parameter value such that the first quantization parameter threshold is between 40% and 55% of a difference between the maximum and minimum available quantization parameter values and the second quantization parameter threshold is between 65% and 75% of the difference.

In one or more twenty-eighth embodiments, further to any of the twenty-fifth through twenty-seventh embodiments, the deblock filter strength threshold β offset comprises an offset for determining a deblock filter strength threshold β, which comprises a spatial activity threshold to threshold a spatial activity of a first block and a second block of the picture or slice of video for deblock filtering.

In one or more twenty-ninth embodiments, further to any of the twenty-fifth through twenty-eighth embodiments, the deblock filter strength threshold $t_c$ offset comprises an offset for determining a deblock filter strength threshold $t_c$, which comprises a cross boundary difference threshold to threshold a difference in pixel values across a boundary between a first block and a second block of the picture or slice of video for deblock filtering.

In one or more thirtieth embodiments, further to any of the twenty-fifth through twenty-ninth embodiments, the video for coding comprises the picture having a picture level quantization parameter, wherein the picture comprises multiple slices each having a slice level quantization parameter corresponding thereto, and the machine readable medium further comprises a plurality of instructions that, in response to being executed on the computing device, cause the computing device to perform video coding by determining a first slice of the multiple slices has a first slice level quantization parameter that is outside of a predetermined threshold of the picture level quantization parameter, wherein said selecting comprises selecting the deblock filter strength threshold β offset or the deblock filter strength threshold $t_c$ offset based on the picture quantization parameter and said encoding comprises encoding the deblock filter strength threshold β offset or the deblock filter strength threshold $t_c$ offset into a picture header, selecting a second deblock filter strength threshold β offset or a second deblock filter strength threshold $t_c$ offset based on the first slice level quantization parameter, and encoding the second selected deblock filter strength threshold β offset or the second selected deblock filter strength threshold $t_c$ offset into a bitstream header corresponding to the first slice.

In one or more thirty-first embodiments, at least one machine readable medium may include a plurality of instructions that in response to being executed on a computing device, causes the computing device to perform a method according to any one of the above embodiments.

In one or more thirty-second embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A computer-implemented method for video coding comprising:
   receiving a picture or slice of video for coding, wherein the picture or slice has a picture or slice level quantization parameter (QP) corresponding thereto that is within a range of available QPs;
   selecting a deblock filter strength threshold β offset and $t_c$ offset based on the picture or slice level QP being within a particular zone of a plurality of zones of the range of available QPs, wherein the β offset is a first offset for determining a deblock filter strength threshold β that provides a spatial activity threshold to threshold a spatial activity of a first block and a second block of the picture or slice of video during deblock filtering and the $t_c$ offset is a second offset for determining a deblock filter strength threshold $t_c$ that provides a cross boundary difference threshold to threshold a difference in pixel values across a boundary between the first and second block during the deblock filtering, wherein each zone of the zones comprises multiple consecutive QPs of the range and each zone has a preselected deblock filter strength threshold β offset and $t_c$ offset corresponding thereto, and wherein the zones comprise a low QP zone having a first β offset and a first $t_c$ offset, a mid QP zone having a second β offset and a second $t_c$ offset, and a high QP zone having a third β offset and a third $t_c$ offset, wherein the second β offset and second $t_c$ offset are greater than the first and third β offsets and $t_c$ offsets;
   encoding indicators corresponding to the selected deblock filter strength threshold β offset and $t_c$ offset into a bitstream picture or slice header for the picture or slice of video; and
   transmitting or storing the bitstream.

2. The method of claim 1, wherein the zones are non-overlapping and collectively cover the entire range of available quantization parameters.

3. The method of claim 1, wherein the second deblock filter strength threshold β offset and $t_c$ offset are in the range of one to four, inclusive.

4. The method of claim 1, wherein the low quantization parameter zone consists of quantization parameters available from a minimum available quantization parameter value through a first quantization parameter threshold, the mid quantization parameter zone consists of quantization parameters from a next quantization parameter from the first quantization parameter threshold through a second quantization parameter threshold, and the high quantization parameter zone consists of quantization parameters from a next quantization parameter from the second quantization parameter threshold through a maximum available quantization parameter value, wherein the first quantization parameter threshold is between 40% and 55% of a difference between the maximum and minimum available quantization parameter values and the second quantization parameter threshold is between 65% and 75% of the difference.

5. The method of claim 1, wherein the plurality of zones consist of a number of zones in the range of two to 13 zones, inclusive.

6. The method of claim 1, wherein the video for coding comprises the picture having the picture level quantization parameter, and wherein the picture comprises multiple slices each having a slice level quantization parameter corresponding thereto, the method further comprising:
   determining whether each slice level quantization parameter is within a predetermined threshold of the picture level quantization parameter; and
   in response to each slice level quantization parameter being within the predetermined threshold of the picture level quantization parameter, selecting the deblock filter strength threshold β offset and $t_c$ offset based on the picture quantization parameter for each slice.

7. The method of claim 1, wherein the video for coding comprises the picture having the picture level quantization parameter, and wherein the picture comprises multiple slices each having a slice level quantization parameter corresponding thereto, the method further comprising:
  determining a first slice of the multiple slices has a first slice level quantization parameter that is outside of a predetermined threshold of the picture level quantization parameter, wherein said selecting comprises selecting the deblock filter strength threshold β offset and the deblock filter strength threshold $t_c$ offset based on the picture quantization parameter and said encoding comprises encoding the deblock filter strength threshold β offset and the deblock filter strength threshold $t_c$ offset into a picture header;
  selecting, in response to the first slice level quantization parameter being outside of the predetermined threshold of the picture level quantization parameter, a second deblock filter strength threshold β offset and a second deblock filter strength threshold $t_c$ offset based on the first slice level quantization parameter; and
  encoding the second selected deblock filter strength threshold β offset and the second selected deblock filter strength threshold $t_c$ offset into a bitstream header corresponding to the first slice.

8. The method of claim 1, further comprising:
  determining a second quantization parameter corresponding to the first and second blocks;
  adding the second quantization parameter and a value corresponding to the deblock filter strength threshold β offset or $t_c$ offset to generate a representative value;
  determining a deblock filter strength threshold β or $t_c$ based on the representative value;
  selecting a deblock filter based on the deblock filter strength threshold β or $t_c$ and pixel values of the first and second blocks;
  deblock filtering first and second reconstructed blocks using the selected deblock filter to generate a deblock filtered picture or slice of video; and
  storing the deblock filtered picture or slice of video to a picture buffer.

9. A system for video coding comprising:
  a memory to store a picture or slice of video, wherein the picture or slice has a picture or slice level quantization parameter (QP) corresponding thereto that is within a range of available QPs; and
  a processor coupled to the memory, the processor to:
    select a deblock filter strength threshold β offset and $t_c$ offset based on the picture or slice level QP being within a particular zone of a plurality of zones of the range of available QPs, wherein the β offset is a first offset for determining a deblock filter strength threshold β that provides a spatial activity threshold to threshold a spatial activity of a first block and a second block of the picture or slice of video during deblock filtering and the $t_c$ offset is a second offset for determining a deblock filter strength threshold $t_c$ that provides a cross boundary difference threshold to threshold a difference in pixel values across a boundary between the first and second block during the deblock filtering, wherein each zone of the zones comprises multiple consecutive QPs of the range and each zone has a preselected deblock filter strength threshold β offset and $t_c$ offset corresponding thereto, and wherein the zones comprise a low QP zone having a first β offset and a first $t_c$ offset, a mid QP zone having a second β offset and a second $t_c$ offset, and a high QP zone having a third β offset and a third $t_c$ offset, wherein the second β offset and second $t_c$ offset are greater than the first and third β offsets and $t_c$ offsets, and
    encode indicators corresponding to the selected deblock filter strength threshold β offset and $t_c$ offset into a bitstream picture or slice header for the picture or slice of video.

10. The system of claim 9, wherein the zones are non-overlapping and collectively cover the entire range of available quantization parameters.

11. The system of claim 9, wherein the low quantization parameter zone consists of quantization parameters available from a minimum available quantization parameter value through a first quantization parameter threshold, the mid quantization parameter zone consists of quantization parameters from a next quantization parameter from the first quantization parameter threshold through a second quantization parameter threshold, and the high quantization parameter zone consists of quantization parameters from a next quantization parameter from the second quantization parameter threshold through a maximum available quantization parameter value, wherein the first quantization parameter threshold is between 40% and 55% of a difference between the maximum and minimum available quantization parameter values and the second quantization parameter threshold is between 65% and 75% of the difference.

12. The system of claim 9, wherein the video for coding comprises the picture having the picture level quantization parameter, and wherein the picture comprises multiple slices each having a slice level quantization parameter corresponding thereto, the processor further to:
  determine whether each slice level quantization parameter is within a predetermined threshold of the picture level quantization parameter; and
  in response to each slice level quantization parameter being within the predetermined threshold of the picture level quantization parameter, select the deblock filter strength threshold β offset and $t_c$ offset based on the picture quantization parameter for each slice.

13. The system of claim 9, the processor further to:
  determine a second quantization parameter corresponding to the first and second blocks;
  add the second quantization parameter and a value corresponding to the deblock filter strength threshold β offset or $t_c$ offset to generate a representative value;
  determine a deblock filter strength threshold β or $t_c$ based on the representative value;
  select a deblock filter based on the deblock filter strength threshold β or $t_c$ and pixel values of the first and second blocks;
  deblock filter first and second reconstructed blocks using the selected deblock filter to generate a deblock filtered picture or slice of video; and
  store the deblock filtered picture or slice of video to a picture buffer.

14. The system of claim 9, wherein the video for coding comprises the picture having the picture level quantization parameter, wherein the picture comprises multiple slices each having a slice level quantization parameter corresponding thereto, and wherein the processor is further to:
  determine a first slice of the multiple slices has a first slice level quantization parameter that is outside of a predetermined threshold of the picture level quantization parameter, wherein the processor to select comprises the processor to select the deblock filter strength threshold β offset and the deblock filter strength threshold $t_c$ offset based on the picture quantization parameter and the processor to encode comprises the processor to encode the deblock filter strength threshold β offset and the deblock filter strength threshold $t_c$ offset into a picture header, select, in response to the first slice level quantization parameter being outside of the predetermined threshold of the picture level quantization parameter, a second deblock filter strength threshold β offset and a second deblock filter strength threshold $t_c$ offset based on the first slice level quantization parameter, and encode the second selected deblock filter strength threshold β offset and the second selected deblock filter strength threshold $t_c$ offset into a bitstream header corresponding to the first slice.

15. At least one non-transitory machine readable medium comprising a plurality of instructions that, in response to being executed on a computing device, cause the computing device to perform video coding by:

receiving a picture or slice of video for coding, wherein the picture or slice has a picture or slice level quantization parameter (QP) corresponding thereto that is within a range of available QPs;

selecting a deblock filter strength threshold β offset and $t_c$ offset based on the picture or slice level QP being within a particular zone of a plurality of zones of the range of available QPs, wherein the β offset is a first offset for determining a deblock filter strength threshold β that provides a spatial activity threshold to threshold a spatial activity of a first block and a second block of the picture or slice of video during deblock filtering and the $t_c$ offset is a second offset for determining a deblock filter strength threshold $t_c$ that provides a cross boundary difference threshold to threshold a difference in pixel values across a boundary between the first and second block during the deblock filtering, wherein each zone of the zones comprises multiple consecutive QPs of the range and each zone has a preselected deblock filter strength threshold β offset and $t_c$ offset corresponding thereto, and wherein the zones comprise a low QP zone having a first β offset and a first $t_c$ offset, a mid QP zone having a second β offset and a second $t_c$ offset, and a high QP zone having a third β offset and a third $t_c$ offset, wherein the second β offset and second $t_c$ offset are greater than the first and third β offsets and $t_c$ offsets;

encoding indicators corresponding to the selected deblock filter strength threshold β offset and $t_c$ offset into a bitstream picture or slice header for the picture or slice of video; and transmitting or storing the bitstream.

16. The machine readable medium of claim 15, wherein the zones are non-overlapping and collectively cover the entire range of available quantization parameters.

17. The machine readable medium of claim 15, wherein the low quantization parameter zone consists of quantization parameters available from a minimum available quantization parameter value through a first quantization parameter threshold, the mid quantization parameter zone consists of quantization parameters from a next quantization parameter from the first quantization parameter threshold through a second quantization parameter threshold, and the high quantization parameter zone consists of quantization parameters from a next quantization parameter from the second quantization parameter threshold through a maximum available quantization parameter value, wherein the first quantization parameter threshold is between 40% and 55% of a difference between the maximum and minimum available quantization parameter values and the second quantization parameter threshold is between 65% and 75% of the difference.

18. The machine readable medium of claim 15, wherein the video for coding comprises the picture having the picture level quantization parameter, and wherein the picture comprises multiple slices each having a slice level quantization parameter corresponding thereto, the machine readable medium further comprising a plurality of instructions that, in response to being executed on the computing device, cause the computing device to perform video coding by:

determining whether each slice level quantization parameter is within a predetermined threshold of the picture level quantization parameter; and in response to each slice level quantization parameter being within the predetermined threshold of the picture level quantization parameter, selecting the deblock filter strength threshold β offset and $t_c$ offset based on the picture quantization parameter for each slice.

19. The machine readable medium of claim 15, the machine readable medium further comprising a plurality of instructions that, in response to being executed on the computing device, cause the computing device to perform video coding by:

determining a second quantization parameter corresponding to the first and second blocks;

adding the second quantization parameter and a value corresponding to the deblock filter strength threshold β offset or $t_c$ offset to generate a representative value;

determining a deblock filter strength threshold β or $t_c$ based on the representative value;

selecting a deblock filter based on the deblock filter strength threshold β or $t_c$ and pixel values of the first and second blocks;

deblock filtering first and second reconstructed blocks using the selected deblock filter to generate a deblock filtered picture or slice of video; and storing the deblock filtered picture or slice of video to a picture buffer.

20. The machine readable medium of claim 15, wherein the video for coding comprises the picture having the picture level quantization parameter, and wherein the picture comprises multiple slices each having a slice level quantization parameter corresponding thereto, the machine readable medium further comprising a plurality of instructions that, in response to being executed on the computing device, cause the computing device to perform video coding by:

determining a first slice of the multiple slices has a first slice level quantization parameter that is outside of a predetermined threshold of the picture level quantization parameter, wherein said selecting comprises selecting the deblock filter strength threshold β offset and the deblock filter strength threshold $t_c$ offset based on the picture quantization parameter and said encoding comprises encoding the deblock filter strength threshold β offset and the deblock filter strength threshold $t_c$ offset into a picture header;

selecting, in response to the first slice level quantization parameter being outside of the predetermined threshold of the picture level quantization parameter, a second deblock filter strength threshold β offset and a second deblock filter strength threshold $t_c$ offset based on the first slice level quantization parameter; and encoding the second selected deblock filter strength threshold β offset and the second selected deblock filter strength threshold $t_c$ offset into a bitstream header corresponding to the first slice.

* * * * *